US010671222B2

(12) United States Patent
Kuboyama et al.

(10) Patent No.: US 10,671,222 B2
(45) Date of Patent: Jun. 2, 2020

(54) TOUCH SENSOR PATTERN FOR EDGE INPUT DETECTION

(71) Applicant: Apple Inc., Cupertino, CA (US)

(72) Inventors: Yuta Kuboyama, Sunnyvale, CA (US); Kevin F. Holz, Santa Cruz, CA (US); Wesley W. Zuber, Mountain View, CA (US); Massoud Badaye, Sunnyvale, CA (US); Sudip Mondal, Santa Clara, CA (US); Chun-Hao Tung, San Jose, CA (US); Mengshu Huang, Cupertino, CA (US); Der-Song Lin, Cupertino, CA (US); Jinghong Chen, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 14/870,905

(22) Filed: Sep. 30, 2015

(65) Prior Publication Data

US 2017/0090614 A1 Mar. 30, 2017

(51) Int. Cl.
*G06F 3/044* (2006.01)
*G06F 3/0488* (2013.01)
*G06F 1/16* (2006.01)

(52) U.S. Cl.
CPC .............. *G06F 3/044* (2013.01); *G06F 1/163* (2013.01); *G06F 1/169* (2013.01); *G06F 1/1643* (2013.01);
(Continued)

(58) Field of Classification Search
None
See application file for complete search history.

(56) References Cited

U.S. PATENT DOCUMENTS 3,673,327 A 6/1972 Johnson et al.
4,203,280 A 5/1980 Ziegler et al.
(Continued)

FOREIGN PATENT DOCUMENTS

JP 2000-163031 A 6/2000
JP 2001-202178 A 7/2001
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Dorothy Harris
(74) *Attorney, Agent, or Firm* — Kubota & Basol LLP

(57) ABSTRACT

An apparatus is disclosed. In some examples, the apparatus comprises a cover substrate having a front surface, a first edge and a first cavity adjacent to the first edge. In some examples, the apparatus comprises a plurality of touch sensor electrodes disposed opposite the front surface of the cover substrate. In some examples, the apparatus comprises at least one touch sensor edge electrode disposed within the first cavity on a surface that is angled relative to the front surface of the cover substrate. In some examples, at least one touch sensor edge electrode is disposed on an outward facing curved surface of the first cavity. In some examples, the plurality of touch sensor electrodes are formed from a first conductive material and the at least one touch sensor edge electrode is formed from a second conductive material. In some examples, the first conductive material is transparent, and the second conductive material is non-transparent. In some examples, the second conductive material is formed on a black mask layer disposed around a perimeter of a bottom surface of the cover substrate.

27 Claims, 15 Drawing Sheets

(52) U.S. Cl.
CPC ........ *G06F 1/1698* (2013.01); *G06F 3/04883* (2013.01)

(56) References Cited

U.S. PATENT DOCUMENTS

| | | | |
|---|---|---|---|
| 4,506,354 A | 3/1985 | Hansen | |
| 4,746,914 A | 5/1988 | Adler | |
| 4,825,212 A | 4/1989 | Adler et al. | |
| 5,483,261 A | 1/1996 | Yasutake | |
| 5,488,204 A | 1/1996 | Mead et al. | |
| 5,591,945 A | 1/1997 | Kent | |
| 5,825,352 A | 10/1998 | Bisset et al. | |
| 5,835,079 A | 11/1998 | Shieh | |
| 5,854,450 A | 12/1998 | Kent | |
| 5,880,411 A | 3/1999 | Gillespie et al. | |
| 6,061,050 A | 5/2000 | Allport et al. | |
| 6,078,315 A | 6/2000 | Huang | |
| 6,091,406 A | 7/2000 | Kambara et al. | |
| 6,188,391 B1 | 2/2001 | Seely et al. | |
| 6,225,985 B1 | 5/2001 | Armstrong et al. | |
| 6,229,529 B1 | 5/2001 | Yano et al. | |
| 6,252,825 B1 | 6/2001 | Perotto | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,636,197 B1* | 10/2003 | Goldenberg | G05G 1/08 345/156 |
| 6,661,438 B1 | 12/2003 | Shiraishi et al. | |
| 6,690,387 B2 | 2/2004 | Zimmerman et al. | |
| 6,856,259 B1 | 2/2005 | Sharp | |
| 7,015,894 B2 | 3/2006 | Morohoshi | |
| 7,079,118 B2 | 7/2006 | Benard et al. | |
| 7,098,891 B1 | 8/2006 | Pryor | |
| 7,184,064 B2 | 2/2007 | Zimmerman et al. | |
| 7,489,308 B2 | 2/2009 | Blake et al. | |
| 7,499,039 B2 | 3/2009 | Roberts | |
| 7,573,466 B1 | 8/2009 | Marzen et al. | |
| 7,663,607 B2 | 2/2010 | Hotelling et al. | |
| 7,800,592 B2 | 9/2010 | Kerr et al. | |
| 7,822,469 B2 | 10/2010 | Lo | |
| 7,907,129 B2 | 3/2011 | Idzik et al. | |
| 8,169,404 B1 | 5/2012 | Boillot | |
| 8,294,670 B2* | 10/2012 | Griffin | G06F 3/0362 345/156 |
| 8,479,122 B2 | 7/2013 | Hotelling et al. | |
| 8,624,836 B1 | 1/2014 | Miller et al. | |
| 8,736,162 B2* | 5/2014 | Jin | H01L 51/5253 313/483 |
| 8,743,091 B2 | 6/2014 | Bernstein | |
| 8,976,141 B2 | 3/2015 | Myers et al. | |
| 9,047,009 B2 | 6/2015 | King et al. | |
| 9,070,648 B2* | 6/2015 | de Jong | H01L 27/3227 |
| 9,753,436 B2* | 9/2017 | Ely | G04G 21/00 |
| 10,503,271 B2* | 12/2019 | Ely | G06F 1/163 |
| 2004/0164970 A1 | 8/2004 | Benard et al. | |
| 2005/0017959 A1 | 1/2005 | Kraus et al. | |
| 2005/0052432 A1 | 3/2005 | Kraus et al. | |
| 2005/0083313 A1 | 4/2005 | Hardie-Bick | |
| 2005/0248548 A1 | 11/2005 | Tsumura et al. | |
| 2006/0197750 A1 | 9/2006 | Kerr et al. | |
| 2006/0197753 A1 | 9/2006 | Hotelling | |
| 2007/0211031 A1 | 9/2007 | Marc | |
| 2007/0240913 A1 | 10/2007 | Schermerhorn | |
| 2008/0059761 A1 | 3/2008 | Norman | |
| 2008/0114251 A1 | 5/2008 | Weymer et al. | |
| 2008/0207281 A1* | 8/2008 | Tsuchiya | G06F 1/1616 455/575.1 |
| 2008/0266266 A1 | 10/2008 | Kent et al. | |
| 2008/0297638 A1* | 12/2008 | Hiratsuka | H04N 5/23293 348/333.02 |
| 2009/0273570 A1 | 11/2009 | Degner et al. | |
| 2010/0231238 A1* | 9/2010 | Toyota | G01D 5/2405 324/662 |
| 2011/0298699 A1 | 12/2011 | Goto et al. | |
| 2012/0139852 A1* | 6/2012 | Huang | G06F 3/0412 345/173 |
| 2012/0139880 A1 | 6/2012 | Shirakawa | |
| 2012/0212445 A1 | 8/2012 | Heikkinen et al. | |
| 2013/0154955 A1* | 6/2013 | Guard | G06F 1/1626 345/173 |
| 2014/0009441 A1* | 1/2014 | Bernstein | G06F 3/016 345/174 |
| 2014/0016048 A1* | 1/2014 | Omote | G06F 3/044 349/12 |
| 2014/0045547 A1 | 2/2014 | Singamsetty et al. | |
| 2014/0087658 A1* | 3/2014 | Hou | G06F 3/041 455/41.1 |
| 2014/0106814 A1 | 4/2014 | Schmidt | |
| 2014/0299884 A1 | 10/2014 | Park et al. | |
| 2014/0328147 A1* | 11/2014 | Yang | G04C 3/007 368/69 |
| 2015/0015512 A1* | 1/2015 | Kwak | G06F 3/0412 345/173 |
| 2015/0070309 A1* | 3/2015 | Kang | G06F 3/044 345/174 |
| 2015/0070312 A1* | 3/2015 | Her | G06F 3/041 345/174 |
| 2015/0109744 A1 | 4/2015 | Jufer et al. | |
| 2015/0227227 A1 | 8/2015 | Myers et al. | |
| 2015/0334211 A1* | 11/2015 | Shin | G06F 3/041 455/566 |
| 2015/0370376 A1 | 12/2015 | Harley et al. | |
| 2016/0004367 A1 | 1/2016 | Shimada | |
| 2016/0033342 A1 | 2/2016 | Lyon et al. | |
| 2016/0058375 A1* | 3/2016 | Rothkopf | G06F 1/1643 600/301 |
| 2016/0098016 A1 | 4/2016 | Ely et al. | |
| 2016/0170624 A1 | 6/2016 | Zambetti et al. | |
| 2016/0209939 A1 | 7/2016 | Zambetti et al. | |
| 2016/0327911 A1 | 11/2016 | Eim et al. | |
| 2017/0090592 A1 | 3/2017 | Ely et al. | |
| 2017/0090599 A1 | 3/2017 | Kuboyama et al. | |
| 2017/0308200 A1* | 10/2017 | Mugiraneza | G06F 3/044 |
| 2018/0181733 A1 | 6/2018 | Shim et al. | |

FOREIGN PATENT DOCUMENTS

| | | |
|---|---|---|
| JP | 2002-342033 A | 11/2002 |
| JP | 2004-184396 A | 7/2004 |
| WO | 2005/103872 A2 | 11/2005 |
| WO | 2005/103872 A3 | 4/2006 |
| WO | 2014/124173 A1 | 8/2014 |
| WO | 2015/034969 A2 | 3/2015 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action received for U.S. Appl. No. 15/275,323, dated Nov. 26, 2019, 15 pages.

Non-Final Office Action received for U.S. Appl. No. 15/275,323, dated Apr. 18, 2019, 13 pages.

Restriction Requirement received for U.S. Appl. No. 15/275,323, dated Jul. 2, 2018, 8 pages.

* cited by examiner

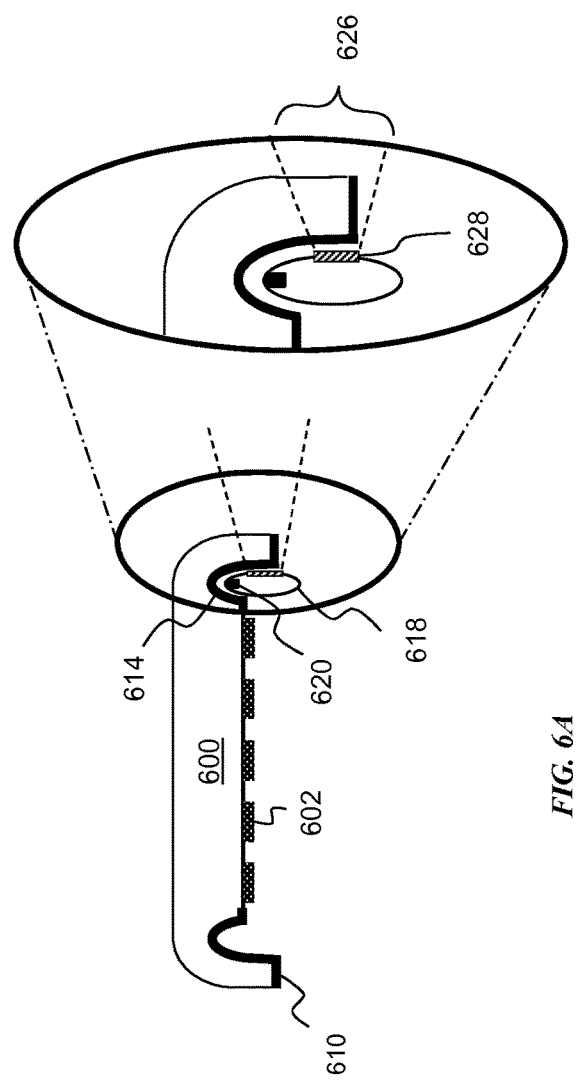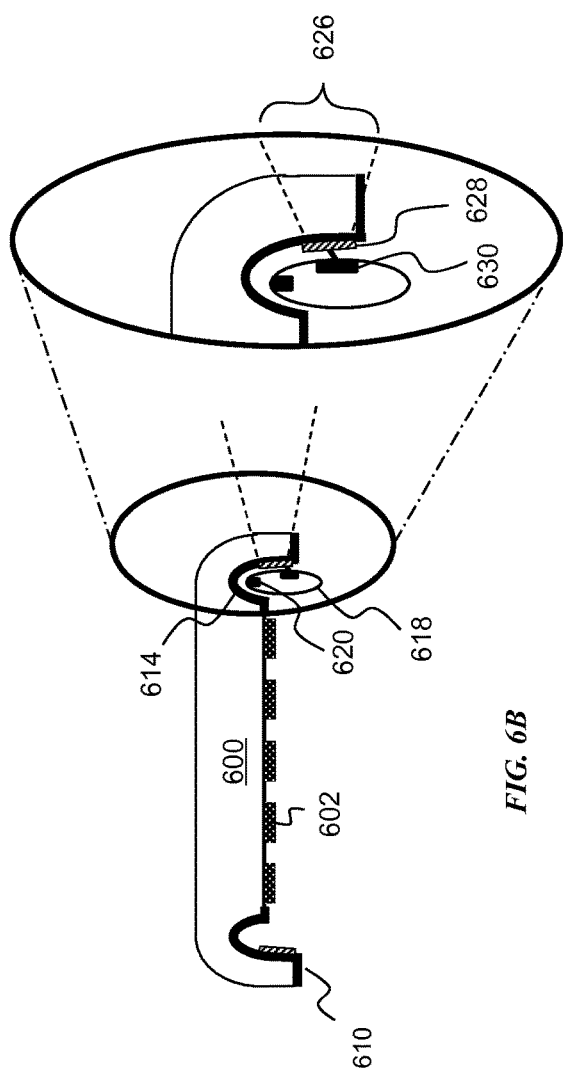
FIG. 6A
FIG. 6B

TOUCH SENSOR PATTERN FOR EDGE INPUT DETECTION

FIELD OF THE DISCLOSURE

This relates generally to touch sensors, and more particularly, to touch sensors for detecting inputs at one or more edges of a touch sensitive device.

BACKGROUND OF THE DISCLOSURE

Many types of input devices are presently available for performing operations in a computing system, such as buttons or keys, mice, trackballs, joysticks, touch sensor panels, touch screens and the like. Touch screens in particular are popular because of their ease and versatility of operation as well as their declining price. A touch screen can include a touch sensor panel, which can be a clear panel with a touch sensitive surface, and a display device such as a liquid crystal display (LCD) that can be positioned partially or fully behind the panel so that the touch sensitive surface can cover at least a portion of the viewable area of the display device. The touch screen can allow a user to perform various functions by touching the touch sensor panel using a finger, stylus or other object at a location often dictated by a user interface (UI) being displayed by the display device. In general, the touch screen can recognize a touch and the position of the touch on the touch sensor panel, and the computing system can then interpret the touch in accordance with the display appearing at the time of the touch, and thereafter can perform one or more actions based on the touch.

SUMMARY OF THE DISCLOSURE

This relates to the addition of edge sensors to a touch panel. The addition of touch sensor edge electrodes can improve touch and/or hover detection at edges of a touch panel. In some examples, the touch panel can be bonded to a substrate (e.g., glass, sapphire, or plastic). In order to provide touch detection at the edge of the touch panel, the touch sensor edge electrodes can be mounted in a cavity of the substrate that has walls or surfaces that are angled relative the front surface of the substrate. With touch and/or hover detection available at edges of the touch panel, new gestures such as pinch (e.g., two fingers placed on two opposing edges of the touch panel simultaneously), edge slides, edge swipes (either toward or away from an edge), etc. can be detected. The touch panel with touch sensor edge electrodes can be included in a wearable or non-wearable portable electronic device. In some examples, the portable electronic device can include one or more mechanical inputs (e.g., knobs, crowns, buttons, etc.). In some examples, the touch sensor edge electrodes can be used to detect whether a user is contacting one or more of the mechanical inputs. For example, touch sensor edge electrodes can allow the portable electronic device to determine whether a user's finger is in contact with a rotatable crown (i.e., finger-on-crown detection). The additional touch detection capabilities provided by the edge sensors of the disclosure can be used to provide new interactions with user interface elements displayed on the personal electronic device.

BRIEF DESCRIPTION OF THE DRAWINGS

FIGS. 6A-6B illustrate cross-sectional views of exemplary touch sensor edge arrangements within a cavity of a cover substrate including an antenna element according to examples of the disclosure.

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to the addition of edge sensors to a touch panel. The addition of touch sensor edge electrodes can improve touch and/or hover detection at edges of a touch panel. In some examples, the touch panel can be bonded to a substrate (e.g., glass, sapphire, or plastic). In order to provide touch detection at the edge of the touch panel, the touch sensor edge electrodes can be mounted in a cavity of the substrate that has walls or surfaces that are angled relative the front surface of the substrate. With touch and/or hover detection available at edges of the touch panel, new gestures such as pinch (e.g., two fingers placed on two opposing edges of the touch panel simultaneously), edge slides, edge swipes (either toward or away from an edge), etc. can be detected. The touch panel with touch sensor edge electrodes can be included in a wearable or non-wearable portable electronic device. In some examples, the portable electronic device can include one or more mechanical inputs (e.g., knobs, crowns, buttons, etc.). In some examples, the touch sensor edge electrodes can be used to detect whether a user is contacting one or more of the mechanical inputs. For example, touch sensor edge electrodes can allow the portable electronic device to determine whether a user's finger is in contact with a rotatable crown (i.e., finger-on-crown detection). The additional touch detection capabilities provided by the edge sensors of the disclosure can be used to provide new interactions with user interface elements displayed on the personal electronic device.

Figure 1:
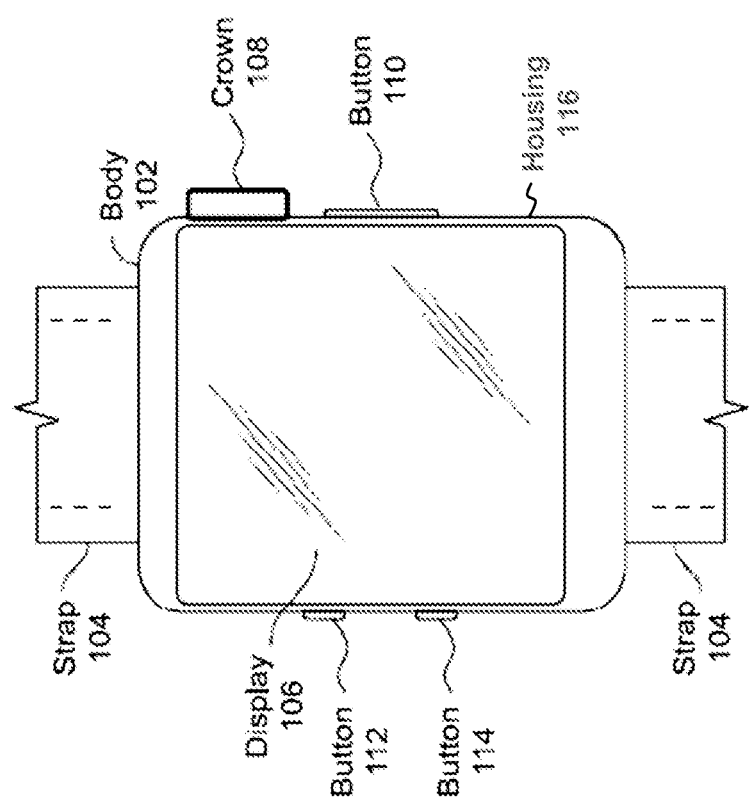
FIG. 1 illustrates an exemplary personal device according to examples of the disclosure.

FIG. 1 illustrates exemplary personal electronic device 100 according to examples of the disclosure. In the illustrated example, device 100 can be a watch that generally includes body 102 and strap 104 for affixing device 100 to the body of a user. That is, device 100 can be wearable. Body 102 can be designed to couple with straps 104. Device 100 can have touch-sensitive display screen (hereafter touchscreen) 106 and crown 108. Device 100 can also have buttons 110, 112, and 114. Though device 100 is illustrated as being a watch, it is understood that the examples of the disclosure can be implemented in devices other than watches, such as tablet computers, mobile phones, or any other wearable or non-wearable electronic device.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical, meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be configured to tilt in one or more directions or slide along a track at least partially around a perimeter of body 102. In some examples, more than one crown 108 can be included in device 100. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Touch sensing can be achieved by sensing a capacitance formed between a touch sensor electrode and an object, e.g., a user's finger or hand, proximate thereto. The electrodes can be coupled to conductive traces, where one set of conductive traces can form drive lines to drive the electrodes with drive signals from drive circuitry and another set of conductive traces can form sense lines to transmit touch or sense signals, indicative of a touch proximate to the display 106, from the electrodes to sense circuitry. In some examples, additional electrodes can be added near the edges of display 106, and can be used to indicate the touch or proximity of an object at the edges of housing 116. One type of touch panel for display 106 can have a row-column electrode pattern. Another type of touch panel for display 106 can have a pixelated electrode pattern. Display 106 can allow a user to perform various functions by touching or hovering near the touch sensor panel using one or more fingers or other objects.

In some examples, device 100 can further include one or more pressure sensors (not shown) for detecting an amount of force or pressure applied to the display 106. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position of the force that is being applied to display 106.

Figure 2:
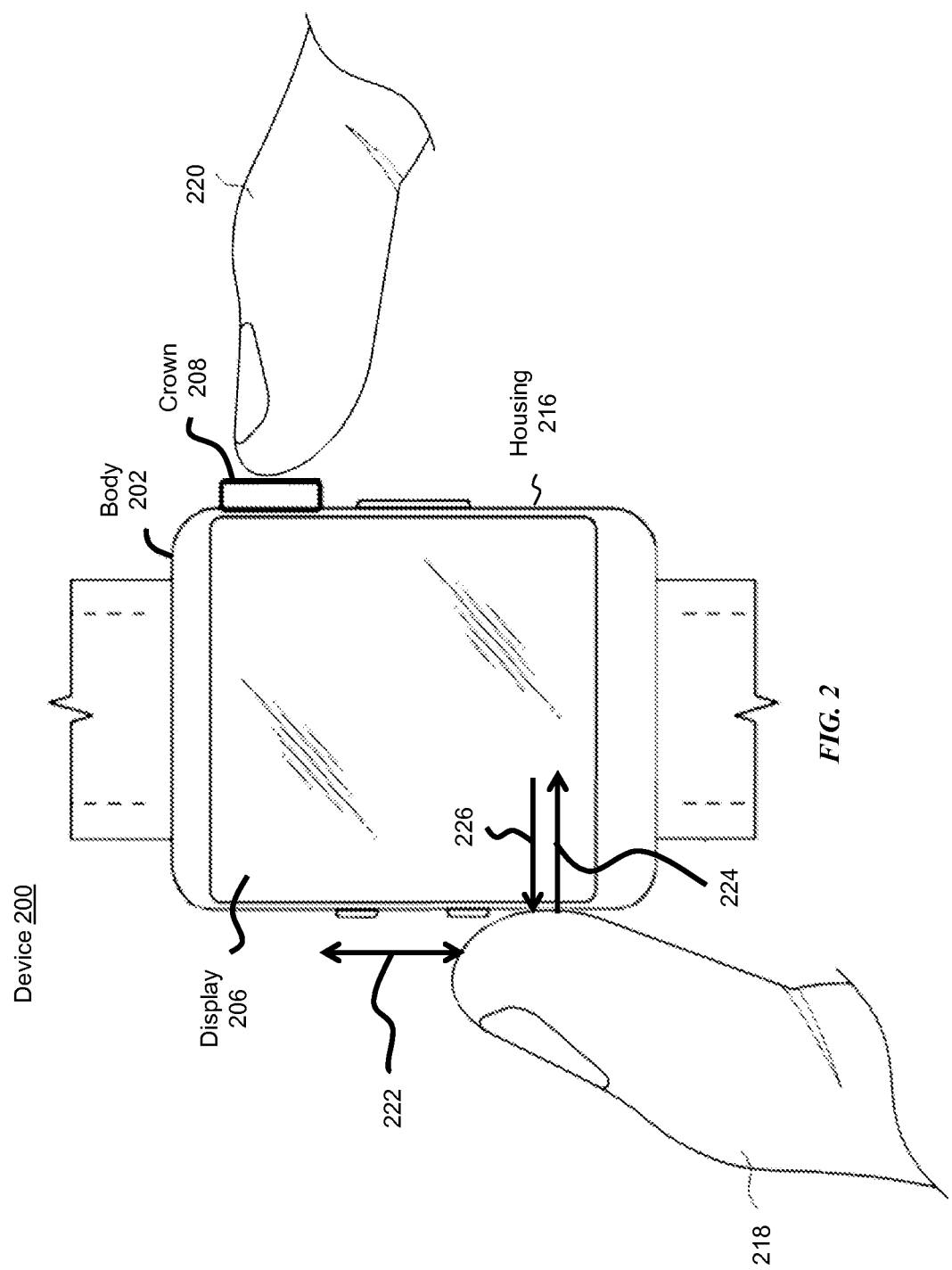
FIG. 2 illustrates exemplary touch and gesture functionality of an electronic device that can be enhanced by the addition of touch sensor edge electrodes according to examples of the disclosure.

FIG. 2 illustrates exemplary touch and gesture functionality of an exemplary electronic device 200 (which can correspond to electronic device 100 above) that can be enhanced by the addition of touch sensor edge electrodes according to examples of the disclosure. Exemplary implementations for adding touch sensor edge electrodes are described in further detail below. In some examples, touch sensor edge electrodes positioned at the edges of housing 216 (which can correspond to housing 116 above) can allow sensing of the presence of a finger 220 on crown 208 (which can correspond to crown 108 above). This "finger-on-crown" detection can be possible because crown 208 can be close to the edges of housing 216, and thus when a finger is on the crown, it can also be close to the edge of the housing such that touch sensor edge electrodes positioned at the edges of the housing can sense the presence of the finger. In some examples, detecting the presence of a finger on the crown 208 (i.e., a finger-on-crown condition) can enrich a user's experience with device 200.

For example, device 200 can display a user interface on display 206. In some examples, when crown 208 is rotated downward while the user interface is displayed on display 206 (which can correspond to display 106 above) of device 200, a portion of a window (not shown) or any other user interface element can emerge from, for example, the top of the display. In some examples, an increasing portion of the window can emerge from the top of the display as crown 208 continues to be rotated downward by finger 220. In some examples, as long as rotation of the crown 208 is continuous (e.g., no interruption of rotation detected lasting longer than, e.g., 500 ms), the device 200 can detect the rotation and make an inference about the state of the crown 208 (e.g., a finger is contacting the crown because the crown is being rotated). However, once the rotation of crown 208 ends, in some examples, device 200 can no longer infer the presence of a finger 220 based on rotation to determine the state of the crown 208. In some examples, once rotation of the crown 208 stops, device 200 can be unable to distinguish whether the finger 220 remains on the crown or the finger has been completely removed from the crown. In such an example, the user interface can provide a default behavior that occurs once rotation of crown 208 stops. For example, the user interface can provide a default behavior such that the window disappears from display 206 once rotation of crown 208 stops (e.g. after a 500 ms interruption of rotation described above). In some examples, a user might expect the described default behavior to occur when the user stops rotating crown 208 and subsequently removes finger 220 from the crown. In other examples, a default behavior could be for the window to continue to display on display 206 after rotation of crown 208, regardless of whether finger 220 remains on crown 208. In some examples, this may require a user to provide an addition input to terminate display of the window that would be unnecessary if device 200 was capable of finger-on-crown detection. In some examples, either of the default behaviors described above could potentially cause a user to feel that the user interface on display 206 is responding incorrectly to the user's input.

In some examples, addition of touch sensor edge electrodes can enable the device 200 to distinguish between the finger 220 remaining on the crown 208 without moving the crown, and the finger being completely removed from the crown (i.e. finger-on-crown detection). As explained above, finger-on-crown detection can be made possible because the crown 208 can be close to the edges of housing 216, and thus when a finger is on the crown, it can also be close to the edge of the housing such that touch sensor edge electrodes positioned at the edges of the housing can sense the presence of the finger. The inclusion of such finger-on-crown detection can be used to enhance the user's interaction with the user interface on display 206. For example, regarding behavior of the window discussed above, the finger-on-crown detection can provide an enhanced behavior of the user interface once rotation of the crown 208 stops. In some examples, if the rotation of the crown 208 stops and the finger 220 remains on the crown, the window can remain in the last displayed position on display 206. Once the user removes finger 220 from the crown, the device 200 can detect the change, and the window can disappear from display 206 or perform any appropriate action in response. The above is just one example of the way that the addition of touch sensor edge electrodes can enhance a user experience for operating device 200. In some examples, the addition of touch sensor edge electrodes can also enable functionality such as detecting a sliding motion of a finger 218 along an edge of the device 200 along the direction 222. In some examples, the sliding motion can be used to control a volume setting of the device 200. In some examples, the addition of touch sensor edge electrodes can also allow for detection of input gestures such as a pinch (e.g. when finger 218 and finger 220 contact opposing edges housing 216 at the same time). In some examples, the addition of touch sensor edge electrodes can allow for detection of a finger swiping from the edge of housing 216 on to the display 206 area as depicted by arrow 224. Conversely, in some examples the touch sensor edge electrodes can allow for detection of a finger swiping from the display 206 area to the edge of the housing 216 as depicted by arrow 226. In some examples, both gestures depicted by the arrows 224 and 226 can be considered "edge swipe" gestures. All of the above examples illustrate how the addition of touch sensor edge electrodes according to examples of the disclosure can enhance a user's interaction with a device 200. Examples of various techniques for incorporating touch sensor edge electrodes into a device, e.g. device 200, will be described in detail below.

Figure 3A:
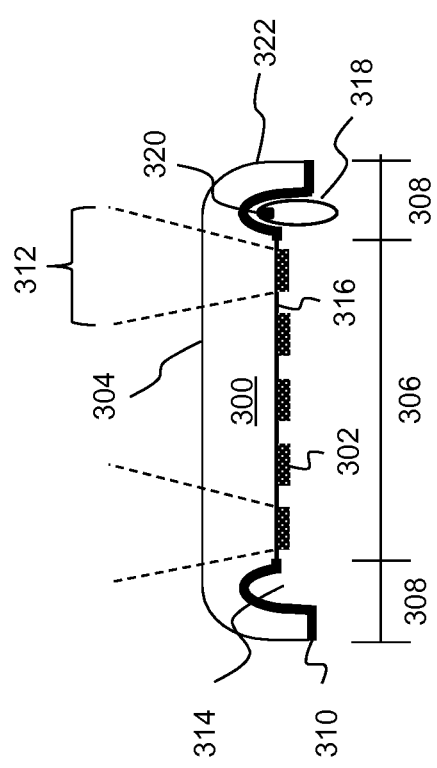
FIGS. 3A-3C illustrate cross-sectional and backside views of exemplary arrangements of touch sensor electrodes according to examples of the disclosure.

FIG. 3A illustrates a cross-sectional view of an exemplary arrangement of touch sensor electrodes 302 disposed on a transparent cover substrate 300, (e.g., glass, sapphire, or plastic) according to examples of the disclosure. The cover substrate 300 can form the top surface of a touch screen assembly, and can generally be made from a durable material to protect sensitive electronics behind the cover substrate (e.g., touch sensor electrodes 302 or display circuitry).

In some examples, touch sensor electrodes 302 can be formed from a transparent conductive material such as Indium Tin Oxide (ITO) or antimony tin oxide (ATO) on the back surface 316 of the cover substrate 300, although other transparent or non-transparent conductive materials can also be used. In some examples, the top surface 304 of cover substrate 300 can be divided into a display region 306 and a border region 308. The border region 308 can be formed by a black mask 310 disposed around the edges of the cover substrate 300, forming a border around a central portion (which can correspond to the display region 306) of the cover substrate. In some examples, the black mask 310 can be formed from a layer of black ink. In some examples, the black mask 310 can be disposed on the back surface 316 of the cover substrate around the perimeter of the display region 306. The display region 306 can be disposed above a liquid crystal display (LCD) (not shown). In some examples, control electronics for the LCD as well as other electronic components that can be part of a device can be hidden from a user's view behind the black mask 310 in the border region 308. In some examples, the touch sensor electrodes 302 can be disposed in a pattern within the display region 306 to effectively cover the display region with touch sensor electrodes. In some examples, each touch sensor electrode 302 can correspond to a touch sensitive region 312 extending from the touch sensor electrode through the top surface 304 of the cover substrate 300. In some examples, this arrangement can allow for the entire display region 306 to be touch sensitive.

The dotted lines in FIG. 3A can correspond to touch sensitive regions 312 for touch sensor electrodes 302. For simplicity of illustration, touch sensitive regions 312 are depicted for two touch sensor electrodes 302 near the edges of the display region 306, but it is understood that each touch sensor electrode can similarly correspond to a touch sensitive region. In some examples, the touch sensitive region 312 for each touch sensor electrode 302 can correspond to a region approximately perpendicular to a top surface of the touch sensor electrodes. In some examples, the touch sensitive region 312 can be relatively narrow, such that a touch sensed at a particular touch sensor electrode 302 can be strongly indicative of a location of an object touching or hovering near the top surface 304 of the cover substrate 300. In examples where the touch sensitive regions 312 are relatively narrow, sensitivity in regions where there are no touch sensor electrodes 302 (e.g., near the edges of the cover substrate 300) can be very limited or completely nonexistent. In other examples, each touch sensitive region 312 can be relatively wide, which can provide improved touch sensitivity at the edges of the cover substrate 300, and can also result in a correspondingly increased overlap of touch sensitive regions 312 between multiple touch sensor electrodes 302. In some examples, an overlap of touch sensitive regions 312 can allow for smoother transition of touch detection between touch sensor electrodes 302. In some examples, edges of the cover substrate 300 can have a curve at the top surface 304 to create a curved bezel 322 at the edge of the cover substrate.

In some examples, one or more cavities 314 can be included at one or more edges of the back surface 316 of transparent cover substrate 300. In some examples, the one or more cavities 314 can be shaped with a semi-circular or semi-oval cross section to form an enclosure for one or more antenna elements 318. In some examples, the antenna elements 318 can be a structural element that can be used, among other purposes, to provide physical structure for one or more antenna electrodes 320 that can be used for transmitting and/or receiving communication signals (e.g., Bluetooth), and for positioning the antenna electrodes in a desired location. In some examples, in addition to providing a physical structure for the antenna electrodes 320, the antenna element 318 can house or support additional antenna electronic components and signal routing. Antenna electrodes 320 can be positioned at the top of the antenna element 318, such that the antenna electrode is close to the front surface 304 of the cover substrate 300. In some examples, antenna elements 318 can be obscured from a user's view by the black mask 310, disposed in the cavity 314 on the back surface 316 of the cover substrate 300. Although semi-circular or semi-oval cavities have been described, other cavity shapes which can receive at least a portion of an antenna element 318 can be used.

In some examples, manufacturing process limitations may require that clearance is provided between the touch sensor electrodes 302 and the black mask 310 to avoid inadvertent overlap of the touch sensor electrodes with the black mask. In some examples, the touch sensor electrodes 302, which can be formed from ITO, may form a stronger bond with the material of the cover substrate 300 than the black mask 310. In some examples, if the ITO pattern is misaligned, the ITO pattern can partially or completely overlap the black mask. In these examples, the overlapping ITO material could delaminate (i.e., become detached) from the cover substrate 300, thus compromising one or more touch sensor electrodes 302 at the edge of the display region 306, and potentially rendering one or more of the touch sensor electrodes inoperable near the edge of the display area. Thus, in some examples, it may be preferable for touch sensor electrodes 302 in the black mask region to be formed from a conductor that adheres well to the black mask. In some examples, a non-transparent conductor that has good adhesion properties with the black mask 310 can be used to avoid the potential problems for electrodes near the edge of the display area 306. Exemplary electrode arrangements near the edge of the cover substrate 300 according to examples of the disclosure are discussed in more detail below.

Figure 3B:
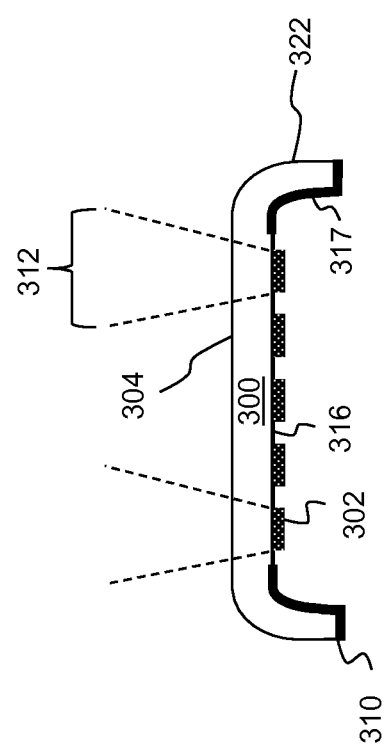

FIG. 3B illustrates a cross-sectional view of transparent cover substrate 300, which can be formed without the cavities 314 disclosed in FIG. 3A. In some examples, the black mask 310 can be formed around the edges of the back surface 316 of cover substrate 300. In some examples, edges of the cover substrate 300 can have a curve 322 at the top surface 304 to create a curved bezel at the edge of the cover substrate. In some examples, the back surface 316 can have a corresponding curved portion 317 at the edge of the cover substrate 300. In some examples, the cover substrate 300 depicted in FIG. 3B may be less well-suited to maintaining a position of an object such as an antenna element relative to the cover substrate including cavities depicted in FIG. 3A. In some examples, the cover substrate 300 without cavities 314 can leave more room behind the back surface 316 of the cover substrate for display components, structural members, power supplies, etc. In some examples, a cover substrate 300 without cavities 314 can be produced with a simplified manufacturing process for forming the shape of the cover substrate. In some examples, formation of a cavity 314 in cover substrate 300 can require use of specialized tools for carving out the cavity that can increase production costs. In some examples, formation of the cavity 314 can require additional processing steps (e.g., carving) that can add time to the manufacturing process of cover substrate 300.

Figure 3C:
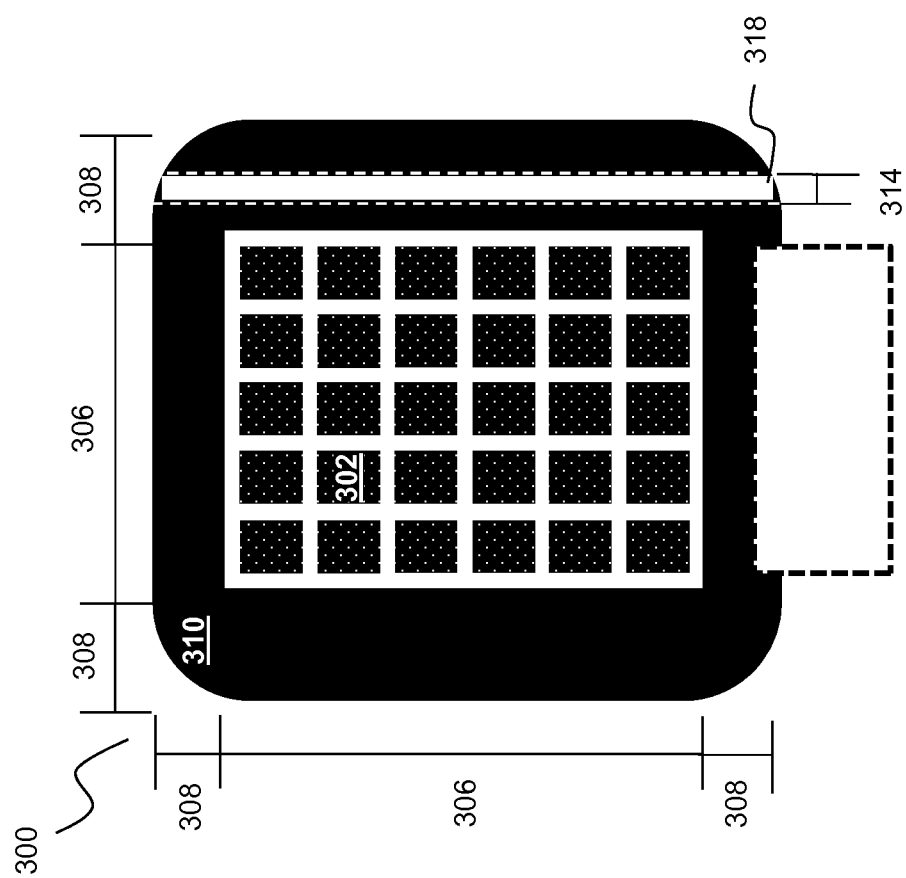

FIG. 3C illustrates a bottom view of an example arrangement of touch sensor electrodes 302 disposed on a transparent cover substrate 300 according to examples of the disclosure. From this view, it can be seen that touch sensor electrodes 302 can be arranged in a pattern of rows and columns to provide touch sensor electrode coverage for the display region of the cover substrate 300. In some examples, cavity 314 can include antenna element 318 which can at least partially fit within the cavity near an edge of the cover substrate 300. In some examples, the antenna element 318 can have a length approximately equal to the full length of the cavity 314 such that the antenna element can span almost the full length of an edge of the cover substrate 300. In some examples, the antenna element 318 can span only a portion of the length of the cavity 314. From this bottom view, it can be seen that in some examples, the border region 308, which can be covered by the black mask 310, can be a zone without any touch sensor electrodes 302. In other words, the touch sensitivity in the areas around the edge of the cover substrate 300 can either be very low or touches around the edges can possibly not be detected at all. Even if the touch sensor electrodes 302 are able to detect a signal from an object in proximity to the edge of the cover substrate 300, the detected signal is likely to be weak because of the distance between the touch sensor electrodes at the edge of display area 306 and the edges of the cover substrate 300.

The positions and shapes of the touch sensor electrodes according to examples of the disclosure are not limited to those illustrated in the figures. In some examples, touch sensor electrodes 302 can be arranged in a pixelated self capacitance touch sensor electrode arrangement. In some examples, touch sensor electrodes 302 can be formed as row and column traces representing drive and sense lines that can be formed perpendicular to each other, although in other examples, other non-orthogonal orientations are possible. For example, in a polar coordinate system, the sensing lines can be concentric circles and the driving lines can be radially extending lines (or vice versa).

Figure 4A:
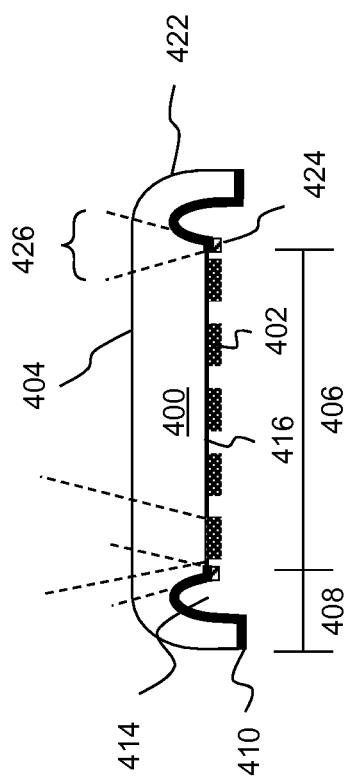
FIGS. 4A-4B illustrate cross-sectional views of exemplary touch sensor border electrode and touch sensor edge electrode configurations according to examples of the disclosure.

FIG. 4A illustrates an exemplary cross-sectional view of a touch sensor edge electrode configuration according to examples of the disclosure. In some examples, a cover substrate 400 (which can correspond to cover substrate 300 above) can include touch sensor border electrodes 424 behind the black mask 410 on a flat portion of the back surface 416 (which can correspond to back surface 416 above), which can extend a touch sensitive area of the cover substrate and improve touch sensitivity at the edges of the cover substrate. The cover substrate 400 can include a flat portion and cavities 414 (which can correspond to cavities 314) at edges of the back surface 416 of the cover substrate, as described with reference to FIG. 3A. In some examples, cover substrate 400 can include curved bezel sections 422 that can extend below the flat portion of back surface 416. These curved bezel sections can be used for mounting the cover substrate 400 within a device housing (not shown) and can be used for providing mechanical stability. In some examples, additional touch sensor border electrodes 424 can be disposed behind the black mask 410 (which can correspond to black mask 310 above) on the flat portion of the back surface 416 of cover substrate 400. In some examples, the touch sensor border electrodes 424 can have similar dimensions to the touch sensor electrodes 402 (which can correspond to touch sensor electrodes 302 above) in the display region 406 (which can correspond to display region 306). In other examples, the flat portion under the black mask 410 around the edges of the display region 406 can be kept small to maximize the size of the display region, and the space available to include edge sensors can be significantly smaller than the width of the touch sensor electrodes 402 in the display region. Thus, the touch sensor border electrodes 424 can be smaller (e.g. have less total area) than the touch sensor electrodes 402 in the display region 406 (e.g., 30% or less of the size of the touch sensor electrodes 402). In some examples, a touch sensitive region 426 can be associated with the touch sensor border electrodes 424. In some examples, smaller touch sensor border electrodes 424 can result in a narrower touch sensitive region 426 when compared with the larger touch sensor electrodes 402 in the display region 406. In addition, the smaller electrodes can result in a touch sensitive region 426 that extends a shorter distance beyond the front surface 404 of the cover substrate 400 relative to the touch sensor electrodes 402 (e.g., touch sensitive region 312 above). Because the touch sensitive region 426 that can be associated with touch sensor border electrodes 424 can be directed toward the front surface 404 of the cover substrate, detection of objects approaching at the side of the cover substrate can still be limited, even when touch sensor border electrodes 424 are added to the cover substrate 400.

Figure 4B:
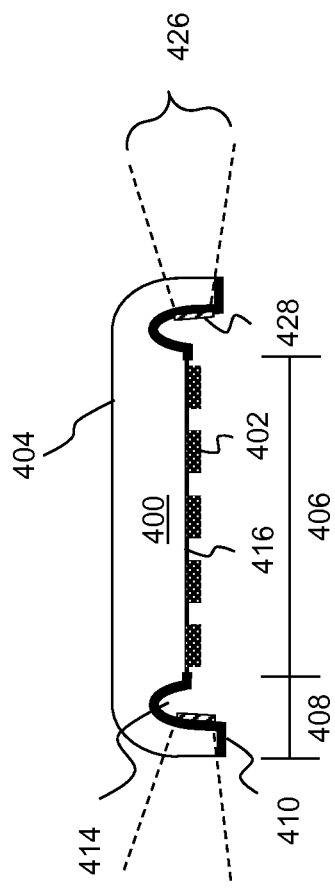

FIG. 4B illustrates another exemplary cross-sectional view of a touch sensor edge electrode configuration according to examples of the disclosure. In some examples, cover substrate 400 can include touch sensor edge electrodes 428 on a curved surface of a cavity 414 in the cover substrate 400. The touch sensor edge electrodes 428 on the curved surface of cavity 414 can face in a direction that is perpendicular or nearly perpendicular to the flat portion of the cover substrate. In some examples, relatively flat touch sensor edge electrodes 428 can be positioned on a portion of the curved surface of cavity 414 having a relatively large radius of curvature (e.g., the touch sensor edge electrode can be formed on a relatively flat portion of cavity 414). In some examples, the touch sensor edge electrodes can be formed along a an outward facing edge of a cavity 414 that results in the formation of a more significantly curved touch sensor edge electrode 428. In some examples, an antenna element with an antenna electrode (e.g. antenna element 318 with antenna electrode 320) can at least partially fit within the same cavity as touch sensor edge electrodes 428. The position of the touch sensor edge electrodes 428 can determine the location of a touch sensitive region 426 that is associated with the additional touch sensor edge electrodes. In some examples, a touch sensitive region 426 can be associated with the added touch sensor edge electrodes 428 on the curved bezel portion of cavity 414. Thus, the touch sensor edge electrodes 428 can provide a touch sensitive region 426 that is facing outward from the edges of the cover substrate 400, in contrast to the touch sensor electrodes 402 in the display region 406 that can be primarily directed toward the top surface 404 of the cover substrate. Thus, touch sensor edge electrodes 428 can significantly improve touch sensitivity at the edges of a cover substrate 400, and can be used for enhanced edge input detection as described above. It should be understood that although touch sensor edge electrodes 428 may be described herein as being primarily located in an antenna cavity (on the side of the cavity or on an antenna element), in other examples of the disclosure the touch sensor edge electrodes can be located in any perimeter area of the device that is capable of supporting the electrodes in a direction conducive to edge input detection.

Although FIG. 4A illustrates a cover substrate 400 with only touch sensor border electrodes 424 and FIG. 4B illustrates a cover substrate with only touch sensor edge electrodes, in some examples, both touch sensor border electrodes and touch sensor edge electrodes can be included on the back surface 416 of the same cover substrate 400. This configuration can extend the touch sensitive area both at the edges of front surface 404 of the cover substrate 400 and at the edges of the cover substrate bezel to make the majority of the exterior of the cover substrate touch sensitive. It should be noted that in some examples, the touch sensor edge border electrodes 424 and touch sensor edge electrodes 428 can be included on a cover substrate 400 without cavities (e.g. cover substrate 300 depicted in FIG. 3B) in a manner analogous to those described with reference to FIGS. 4A and 4B.

Figure 5:
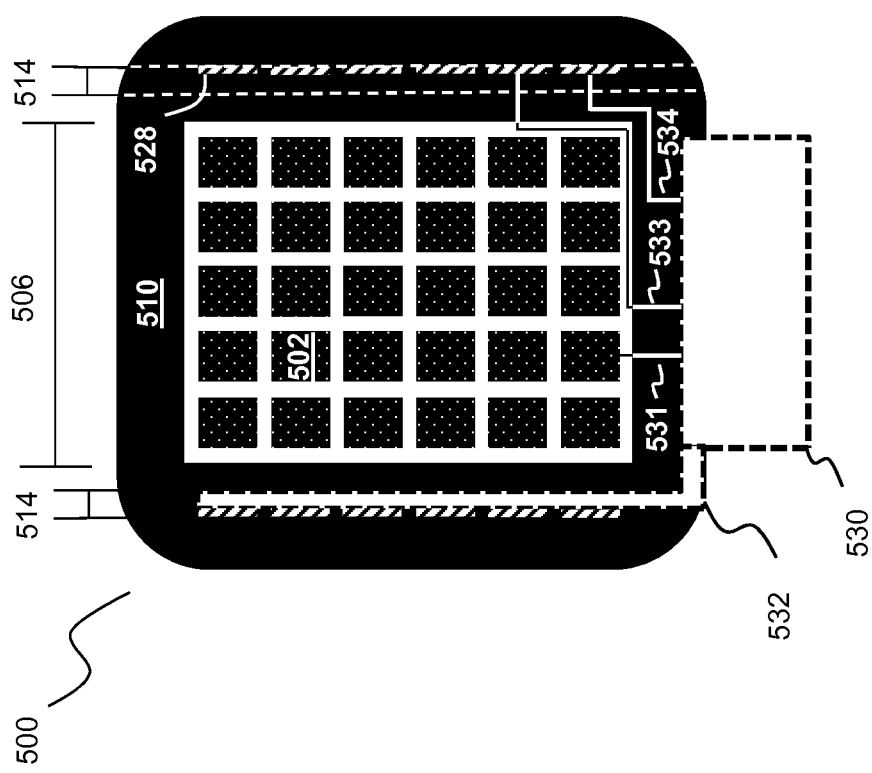
FIG. 5 illustrates a backside view of a cover substrate including an exemplary touch sensor edge electrode configuration according to examples of the disclosure.

FIG. 5 illustrates a backside view of a cover substrate 500 (which can correspond to cover substrate 400 above) which can include touch sensor edge electrodes 528 according to examples of the disclosure. In some examples, touch sensor electrodes 502 can be connected through routing traces 531 in a display region 506 (which can correspond to display region 306 above) to a flexible circuit board 530 coupled to the cover substrate 500. In some examples, the routing trace pattern for the touch sensor electrodes 502 (which can correspond to touch sensor electrodes 402 above) can be extended to the black mask 510 (which can correspond to black mask 410 above) and/or into the cavity 514 (which can correspond to cavity 414 above) to provide routing for touch sensor edge electrodes 528 (which can correspond to touch sensor border electrodes 424 and/or touch sensor edge electrodes 428). In other words, touch sensor edge electrodes 528 can utilize the same type of routing on the cover substrate 500 as do the touch sensor electrodes 502 to couple to appropriate circuitry. For example, routing trace 533 can connect to a touch sensor edge electrode 528 within cavity 514 behind black mask 510, routing trace 533 can route through the display area 506 near the routing traces 531 for touch sensor electrodes 502, and routing trace 533 can continue over the black mask to connect to flexible circuit board 530. In some examples, the routing traces 531 and 533 can both be made from a single type of transparent conductor (e.g., ITO). In some examples, the flexible circuit board 530 can include readout electronics (e.g. one or more analog-to-digital converters) for converting signals detected on the touch sensor electrodes 502 into digital signals. In some examples, the flexible circuit board 530 can provide traces for connecting the touch sensor electrode 502 output signals to readout electronics on a separate board (not shown). In some examples, touch sensor edge electrodes 528 can be disposed on a black mask 510. In some examples, touch sensor edge electrodes 528 can require separate connections to readout electronics than the touch sensor electrodes 502. In some examples, the touch sensor electrodes 502, and the routing traces in both the display region 506 and the routing traces behind the black mask 510 can be formed from ITO, while the touch sensor edge electrodes 528 can be formed from any transparent or non-transparent conductor that can adhere to the curved surface of the cavity 514 (e.g. ITO, silver paste, metal foil). The addition of touch sensor edge electrodes 528 can improve touch and/or hover detection at edges of a cover substrate 500 as described above. It should be understood that the addition of touch sensor edge electrodes 528 without connections to readout circuitry for capturing the touch sensor edge electrode outputs may not provide the above described edge input detection functionality. Accordingly, further examples for routing touch sensor edge electrodes 528 to readout electronics according to examples of the disclosure are provided below.

In some examples, wire leads 534 can be patterned along the black mask 510 on the back surface of cover substrate 500. In some examples wire leads 534 and the touch sensor edge electrodes 528 can be formed from the same type of conductor material. Because the routing can occur behind the black mask 510, it is not necessary for the wire leads 534 or the touch sensor edge electrodes 528 to be formed from a transparent conductor such as ITO. In some examples, the conductor material forming wire leads 534 and touch sensor edge electrodes 528 can be ITO or another transparent conductor, and in other examples the conductor material forming wire leads 534 can be a non-transparent conductor material, such as silver paste or thin metal foil. In some examples, the wire leads 534 can be routed to readout electronics on the flexible circuit board 530. In other examples, the flexible circuit board 530 can provide traces for connecting touch sensor edge electrodes 528 to readout electronics on a separate board (not shown).

In some examples, touch sensor edge electrodes 528 can be patterned directly on a secondary flexible circuit board 532 (e.g. by laminating a copper layer patterned with the touch sensor edge electrode layout). In some examples, the secondary flexible circuit board 532 can be mounted along the curved surface of a cavity of the cover substrate 500 (which can correspond to cavities 414 in FIG. 4A). In some examples, prior to mounting the secondary flexible circuit board 532 in the cavity, the secondary flexible circuit board 532 can be wrapped around a semi-circular or semi-oval shaped insulating material having a cross section conformed to the shape of cavity 514. In some examples, the assembled flexible circuit board 530 and insulating material can be inserted and adhered to cavity 514 (e.g. using a pressure sensitive adhesive, two part epoxy, etc.). In some examples, pre-flexing the secondary flexible circuit board 532 around the insulating material can simplify the assembly process by eliminating a potentially difficult flexure of the secondary flexible circuit board 532 within the cavity 514. In some examples, the secondary flexible circuit board 532 can include traces for connecting the touch sensor edge electrode 528 output signals to flexible circuit board 530. In some examples, the connections between flexible circuit board 530 and secondary flexible circuit board 532 can be provided with board-to-board connections, zero insertion force (ZIF) connectors, anisotropic conductive film (ACF), hot-bar connections, or the like. Connections to readout circuitry can be provided at the flexible circuit board 530 as described above. The descriptions above provide several examples for routing touch sensor edge electrodes 528 to readout electronics according to examples of the disclosure. However, it is understood that other techniques for providing routing between touch sensor edge electrodes 528 and readout electronics are within the scope of the disclosure. The examples above can be applied to touch sensor edge electrodes 528 within cavity 514 and similar routing techniques can be used for touch sensor border electrodes disposed on black mask 510.

FIG. 6A illustrates a cross-sectional view of an exemplary touch sensor edge electrode 628 (which can correspond to touch sensor edge electrodes 428) arrangement disposed on an antenna element 618 (which can correspond to antenna element 318 above) within a cavity 614 (which can correspond to cavity 314 above) of cover substrate 600 according to examples of the disclosure. FIG. 6A includes a magnified view of one edge region of cover substrate 600 (which can correspond to substrate 300 above) including cavity 614. In some examples, antenna element 618 can be disposed within the cavity 614 of cover substrate 600. In some examples antenna element 618 can include one or more antenna electrodes 620 (which can correspond to antenna electrode 320 above) for transmitting and/or receiving communication signals. Touch sensor edge electrode 628 can be formed on a surface of antenna element 618 which can face toward an edge of cover substrate 600. In some examples, the touch sensor edge electrodes 628 can be selectively deposited on the antenna element 618 by sintering, physical vapor deposition (PVD), ink nozzle, or similar processes that can deposit conductive material on a three-dimensional surface of the antenna element. Touch signals from touch sensor edge electrode 628 can be routed via the antenna element 618 structure to readout circuitry. In some examples, the routing signals for touch sensor edge electrodes 628 can be formed from traces along an exterior surface of the antenna element 618. In other examples, signals from touch sensor edge electrodes 628 can be provided within the antenna element on a flexible circuit board (not shown) or discrete routing traces. In some examples, signals from the antenna electrode 620 can also be routed on a flexible circuit board or discrete routing traces within the antenna element 618. In some examples, the connections between touch sensor electrodes 602 and readout circuitry connections can utilize examples described above regarding FIG. 5. In some examples, touch sensitive regions 626 (which can correspond to touch sensitive regions 426 above) associated with touch sensor edge electrodes 628 disposed on the antenna element 618 can provide enhanced touch sensitivity at edges of cover substrate 600 according to examples of the disclosure. The exemplary touch sensor edge electrode 628 arrangement can be used to detect edge inputs and can provide enhanced touch sensing functionality as described in detail above (e.g., finger-on-crown, swipe, and pinch).

FIG. 6B illustrates another exemplary touch sensor edge electrode 628 (which can correspond to touch sensor edge electrodes 428) arrangement disposed on a surface of a cavity 614 (which can correspond to cavity 314) according to examples of the disclosure. FIG. 6B includes a magnified view of one edge region of cover substrate 600 (which can correspond to substrate 300 above) including cavity 614. In some examples, touch sensor edge electrodes 628 can be disposed in cavity 614 directly on and behind the black mask 610 (which can correspond to black mask 310 above) of the cover substrate 600. In some examples, an antenna element 618 (which can correspond to antenna element 318 above) can be included within the same cavity as the touch sensor edge electrodes 628. In some examples, antenna element 618 can include one or more antenna electrodes 620 (which can correspond to antenna electrode 320 above) for transmitting and/or receiving communication signals. In some examples, antenna element 618 can include a conductive contact pad 630 for routing connections from the touch sensor edge electrode 628 via the antenna element. As described above, the antenna element 618 can provide routing connections for signals from the touch sensor edge electrodes 628 on the inside or outside of the antenna element. In some examples, the touch sensor edge electrode 628 and contact pad 630 can be coupled by a jumper wire. In some examples, the touch sensor edge electrodes 628 can be coupled to the contact pad on antenna element 618 by direct conductor-to-conductor contact. In some examples, touch sensitive regions 626 (which can correspond to touch sensitive regions 426 above) associated with touch sensor edge electrodes 628 disposed in the cavity 614 and coupled to antenna element 618 can provide enhanced touch sensitivity at the edge of cover substrate 600. The exemplary touch sensor edge electrode 628 arrangement can be used for edge input detection and can provide enhanced touch sensing functionality as described in detail above (e.g., finger-on-crown, swipe, and pinch).

Additional touch sensor edge electrode configurations (including configurations integrated with antenna elements) that can be used in accordance with the examples of the disclosure will now be described. FIG. 7A illustrates a perspective view of an exemplary antenna element 718 (which can correspond to antenna element 618 in FIG. 6A) according to examples of the disclosure. While antenna element 718 is shown with a circular cross-section, it is understood that an antenna element can be configured with different cross-sectional shapes. In some examples, the antenna element 718 can be shaped to at least partially fit within a cavity (e.g. cavity 314 above) of a cover substrate, as previously described. In some examples, antenna element 718 can include antenna electrode 720 (which can correspond to antenna electrode 620 above) for transmitting and/or receiving communication signals (such an antenna electrode can be referred to as a communication electrode). In some examples, touch sensor edge electrodes 728 (which can correspond to touch sensor edge electrodes 628 above) can be deposited on the antenna element 718. In some examples, the touch sensor edge electrodes 728 can be replaced by contact pads (which can correspond to contact pads 630 in FIG. 6B) for connecting to touch sensor edge electrodes that are formed within a cavity (e.g. cavity 314 above) at least partially containing the antenna element. As described above, the contact pads can be coupled with touch sensor edge electrodes 728 by a jumper wire or by direct conductor-to-conductor contact. In some examples, a plurality of discrete touch sensor edge electrodes 728 can be formed on the antenna element and each touch sensor edge electrode can be configured to sense touch at a corresponding touch sensitive region at the edge of a cover substrate. The exemplary touch sensor edge electrode 728 arrangements described above can be used for edge input detection and can provide enhanced touch sensing functionality as described in detail above (e.g., finger-on-crown, swipe, and pinch).

Figure 7B:
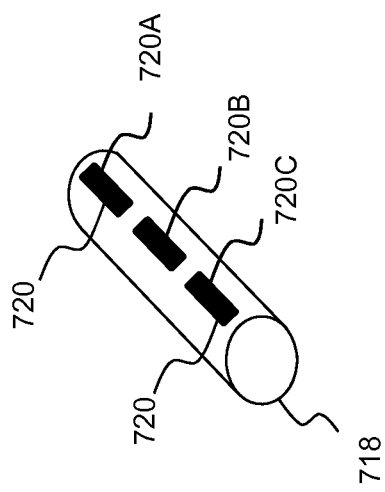
FIGS. 7A-7B illustrate perspective views of exemplary arrangements of touch sensor edge electrodes integrated with antenna elements according to examples of the disclosure.
Figure 7A:
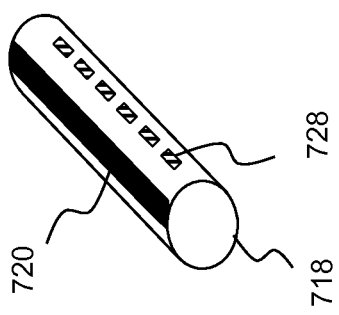

FIG. 7B illustrates a perspective view of another exemplary antenna element 718 (which can correspond to antenna element 318 above) according to examples of the disclosure. In some examples, the antenna electrode can be made up of multiple electrode segments 720. In some examples, one or more of the electrode segments can be used for edge input detection (e.g. used as touch sensor edge electrode 728) according to examples of the description. In some examples, the electrode segment 720 used for edge input detection can be the segment that is physically nearest to a crown (not shown) for enabling finger-on-crown detection according to examples of the disclosure described above. In some examples, electrode segments 720 can be configured to change function between transmitting and/or receiving communication signals and edge input detection dynamically. In some examples, the change in function can be performed in a time-multiplexed manner. In some examples, time multiplexing can be performed on individual electrode segments 720 such that each individual electrode segment can perform an independent function at any moment in time. In some examples, three electrode segments 720 can be used for implementing a time multiplexing sequence. In some examples, during a first time window, two electrode segments 720A and 720B can be used for transmitting and/or receiving communications signals, while electrode segment 720C can be used for edge input detection at an edge of a cover substrate at a first touch sensitive region corresponding to electrode segment 720C. In some examples, during a second time window, electrode segments 720B and 720C can be used for transmitting and/or receiving communication signals while electrode segment 720A can be used for edge input detection at the same edge of the cover substrate at a second touch sensitive region corresponding to electrode segment 720A. During a third window, electrode segment 720B can be used for edge input detection while electrodes 720A and 720C can be used for transmitting and/or receiving communications signals in an analogous fashion. Using the time multiplexing sequence above, the three electrode segments 720 can be used to detect touch at three different touch sensitive regions of an edge of a cover substrate (each region corresponding to one of the segments), while always maintaining two electrode segments for transmitting and/or receiving communications signals. In other examples, all electrode segments can be configured to perform a single function during different time windows of the time-multiplexing sequence. In such examples, potential interference between transmitting and/or receiving communications signals and edge input detection can be avoided. It should be noted that the single-function per time window time-multiplexing sequence could also be used with a single electrode antenna electrode (e.g., antenna electrode 720 above).

Figure 8B:
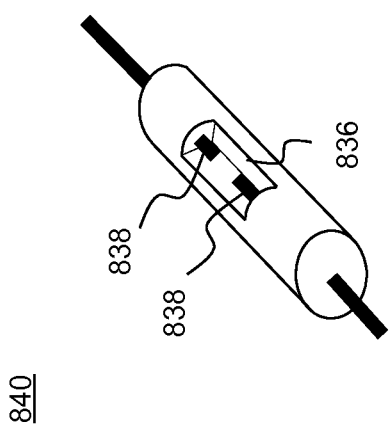
FIGS. 8A-8B illustrate perspective views of exemplary arrangements of touch sensor edge electrodes according to examples of the disclosure.
Figure 8A:
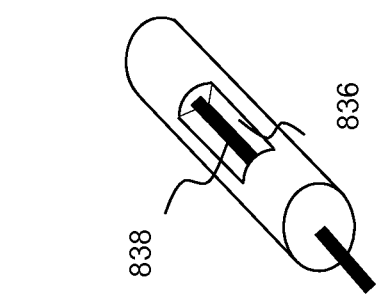

FIGS. 8A and 8B illustrate perspective views of exemplary arrangements of touch sensor edge electrodes 838 according to examples of the disclosure. FIG. 8A illustrates an exemplary touch sensor edge electrode that can be formed by wrapping a conductor 838 within an insulating or non-conductive layer 836 (e.g., foam) to create a cylindrical sensor 840 with a single electrode 838. FIG. 8A illustrates a cutaway showing the conductor 838 that can pass through the center of the insulator 836 that can form cylindrical sensor 840. In some examples, the length of the cylindrical sensor 840 can be configured to cover the entire length of an edge of a cover substrate (e.g., cover substrate 300 above). In some examples, the conductor 838 can be connected to readout circuitry by a portion of the conductor extending outside of the insulator 836. In some examples, the shape of the cylindrical sensor 840 can be configured to at least partially fit within a cavity (e.g. cavity 314 above). Such a single conductor configuration can be used, for example, to enable edge touch detection for the purposes of finger-on-crown detection by detecting a change in capacitance between the conductor and a finger or object near the edge of the cover substrate 800 adjacent to a crown.

FIG. 8B illustrates an exemplary cylindrical sensor 840 that can incorporate two touch sensor edge electrodes 838 according to examples of the disclosure. As with the example above in FIG. 8A, cylindrical sensor 840 can be formed by wrapping conductors 838 within an insulating layer 836. FIG. 8B illustrates a cutaway showing that two sensors can be formed by wrapping two separated conductors 838 within the insulator 836. In some examples, each conductor 838 can be connected to readout circuitry by a portion of each conductor extending outside of the insulator 836. This can allow for detecting touch in two different regions of an edge of cover surface 800 independently (e.g., differentiating a touch near crown 108 in FIG. 1 above from a touch near the bottom of housing 116 on the same edge). Thus, a two-electrode sensor can be formed for enabling edge touch detection according to examples of the disclosure.

Figure 9:
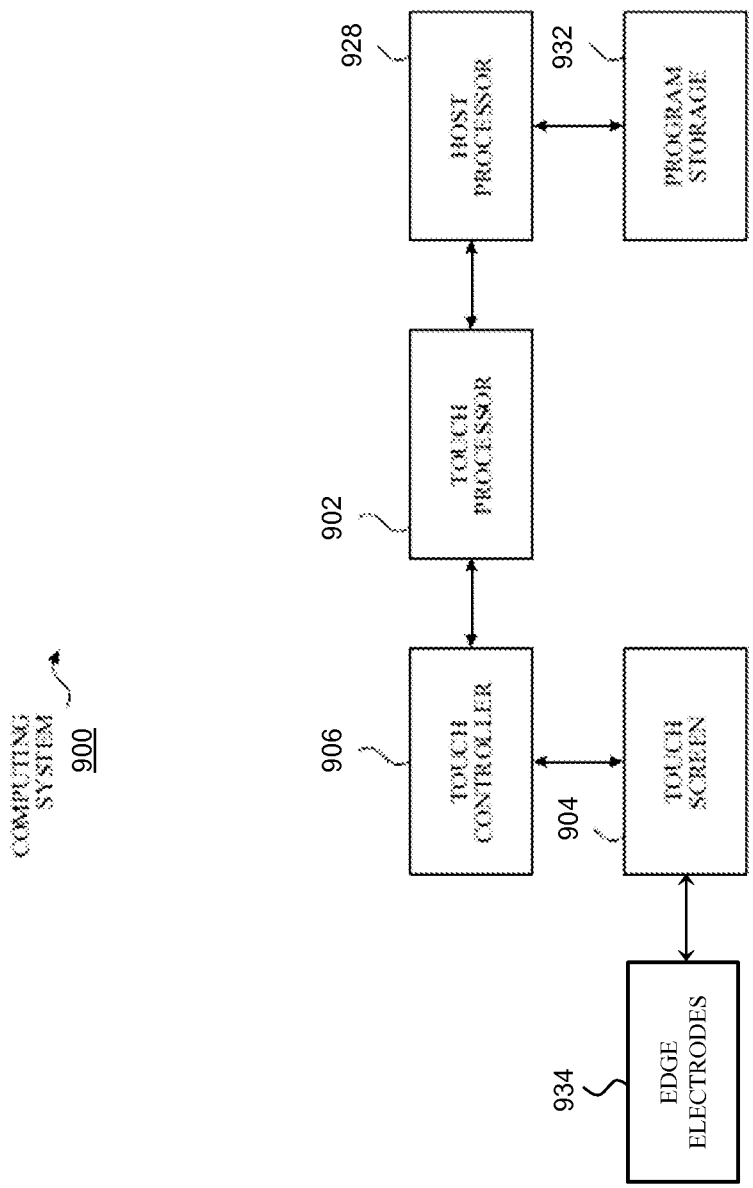
FIG. 9 illustrates an example computer system for implementing edge input detection according to examples of the disclosure.

FIG. 9 illustrates an example computing system 900 for implementing edge input detection according to examples of the disclosure. Computing system 900 can be included in, for example, device 100 above or any mobile or non-mobile computing device and/or wearable or non-wearable device that includes edge electrodes 934 (e.g., touch sensor edge electrodes 424 and/or touch sensor border electrodes 428 described above). Computing system 900 can include a touch sensing system including one or more touch processors 902, touch controller 906 and touch screen 904. Touch screen 904 can be a touch screen adapted to sense touch inputs, as described in the disclosure. Touch controller 906 can include circuitry and/or logic configured to sense touch inputs on touch screen 904. In some examples, touch controller 906 and touch processor 902 can be integrated into a single application specific integrated circuit (ASIC).

Computing system 900 can also include host processor 928 for receiving outputs from touch processor 902 and performing actions based on the outputs. Host processor 928 can be connected to program storage 932. For example, host processor 928 can contribute to generating an image on touch screen 904 (e.g., by controlling a display controller to display an image of a user interface (UI) on the touch screen), and can use touch processor 902 and touch controller 906 to detect one or more touches on or near touch screen 904. Host processor 928 can also contribute to sensing and/or processing edge electrode 934 signals, which can be used to provide enhanced touch sensing functionality, as described in the disclosure. The inputs from touch screen 904 and/or edge electrodes 934 can be used by computer programs stored in program storage 932 to perform actions in response to the touch and/or edge inputs. For example, touch inputs can be used by computer programs stored in program storage 932 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Edge electrode 934 inputs can be used by computer programs stored in program storage 932 to perform actions that can include finger-on-crown detection, as well as swipe and pinch gesture detection as described above. Host processor 928 can also perform additional functions that may not be related to touch and/or edge electrode input processing.

Note that one or more of the functions described above can be performed by firmware stored in memory in computing system 900 and executed by touch processor 902, or stored in program storage 932 and executed by host processor 928. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 10:
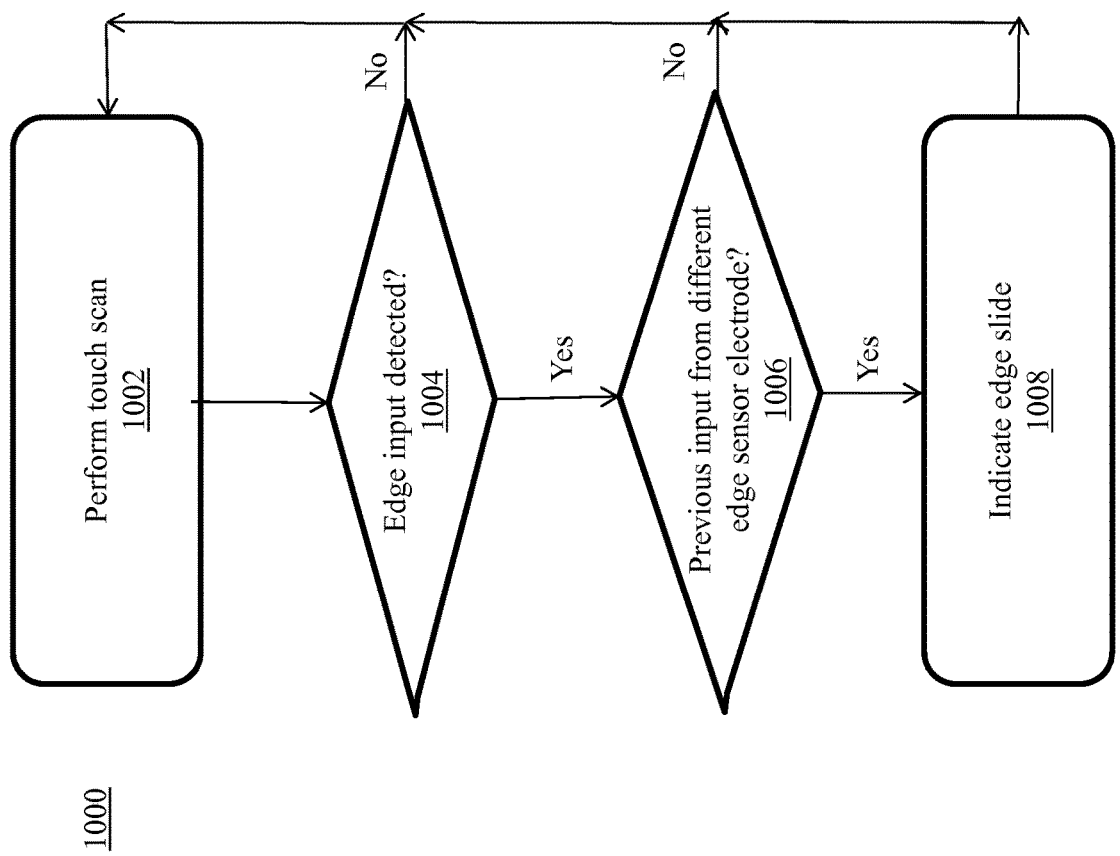
FIG. 10 illustrates an exemplary process for performing edge input detection of an edge slide gesture according to examples of the disclosure.

FIG. 10 illustrates exemplary process 1000 for performing edge input detection of an edge slide gesture according to examples of the disclosure. At step 1002, process 1000 can perform a touch scan to determine if any touch sensor locations of a touch sensor panel (which can include any or all of touch sensor electrodes 302, touch sensor border electrodes 424, and touch sensor edge electrodes 426 described above) has detected a touch input. At step 1004, process 1000 can determine whether a detected touch input at the touch sensor corresponds to an edge input (i.e., an input on touch sensor edge electrodes 426 and/or touch sensor border electrodes 424), a display region input (which can correspond to a touch input in the display region 306 above), multiple inputs, or no input. In some examples, at 1004, process 1000 can determine information about the touch scan—for instance, whether no touch input occurred in the scan, or if a touch input or inputs did occur, the locations of the touch input or inputs, which can include information about whether the touch input occurred at the display region or at an edge, (e.g., of device 100 above) and a location of the touch input or inputs, including which edge the input occurred on, if appropriate. In some examples, process 1000 can store the result of the determination in a memory or register for multiple consecutive touch scans. If it is determined that the detected touch input from the current scan corresponds to an edge input, process 1000 can proceed to step 1006. At step 1006, process 1000 can determine whether a touch input from the previous scan (e.g., previously-stored result in memory or a register) occurred at a different location along a same edge of the touch sensor panel as the detected touch input from the current scan. In some examples, if it is determined that the detected touch input from the current scan occurred at an edge of the touch sensor panel at a first location, and that the touch input from the previous scan occurred at the same edge of the touch sensor panel at a different location, the process 1000 can proceed to step 1008. At step 1008, the process 1000 can indicate that an edge slide gesture has occurred, and further can determine information about the slide such as distance and/or speed of the gesture (e.g., by comparing the positions of the first location and the different location). In some examples, if no touch input is detected at step 1002, process 1000 can perform step 1002 repeatedly (e.g., by polling, edge detection, etc.) until a touch input is detected. In some examples, if step 1004 determines that no edge input was detected during the current scan (e.g., no input was detected or an input was detected only in the display region, which can correspond to display region 306 above), process 1000 can return to step 1002. In some examples, if step 1006 determines that no touch input from the previous scan occurred at a same edge of the touch sensor panel but a different location from the detected edge input and location of the current scan, process 1000 can return to step 1002.

Figure 11:
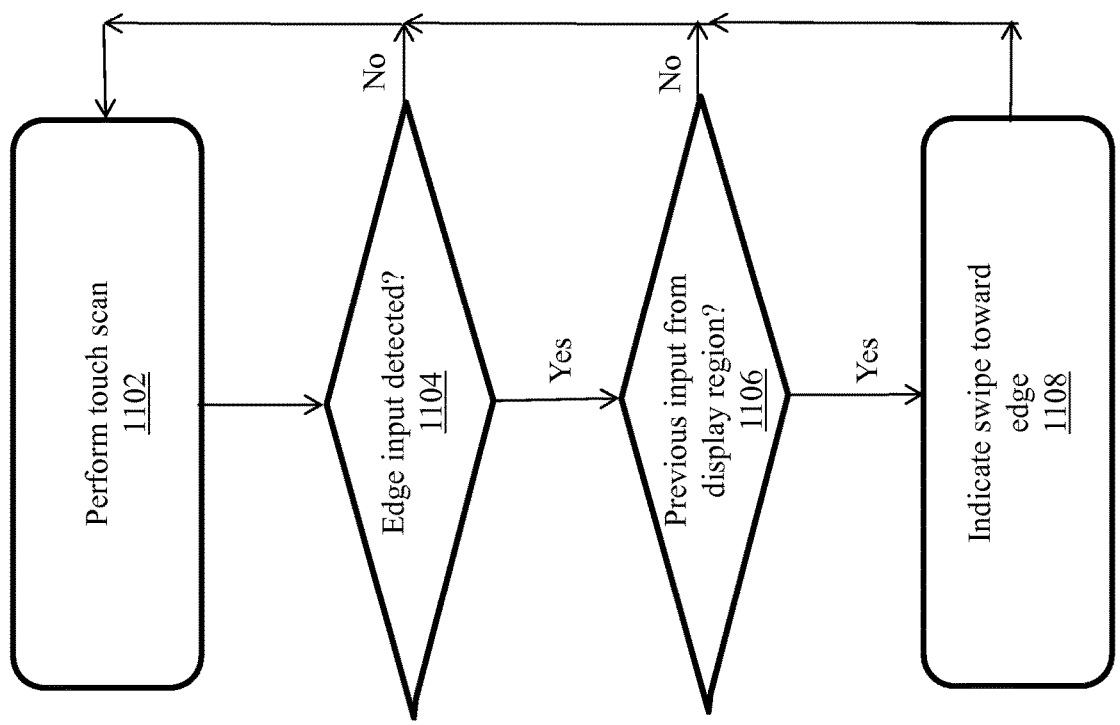
FIG. 11 illustrates another exemplary process for performing edge input detection of a swipe toward edge gesture according to examples of the disclosure.

FIG. 11 illustrates another exemplary process 1100 for performing edge input detection of a swipe toward edge gesture according to examples of the disclosure. At step 1102, process 1100 can perform a touch scan to determine if any touch sensor locations of a touch sensor panel (which can include any or all of touch sensor electrodes 302, touch sensor border electrodes 424, and touch sensor edge electrodes 426 described above) has detected a touch input. At step 1104, process 1100 can determine whether a detected touch input at the touch sensor corresponds to an edge input (i.e. an input on touch sensor edge electrodes 426 and/or touch sensor border electrodes 424), a display region input (which can correspond to a touch input in the display region 306 above), multiple inputs, or no input. In some examples, at 1104, process 1100 can determine information about the touch scan—for instance, whether no touch input occurred in the scan, or if a touch input or inputs did occur, the locations of the touch input or inputs, which can include information about whether the touch input occurred at the display region or at an edge, (e.g., of device 100 above) and a location of the touch input or inputs, including which edge the input occurred on, if appropriate. In some examples, process 1100 can store the result of the determination in a memory or register for multiple consecutive touch scans. In some examples, if it is determined that a detected touch input from the current scan corresponds to an edge input, process 1100 can proceed to step 1106. At step 1106, process 1100 can determine whether a touch input detected at the previous scan (e.g., previously-stored result in memory or a register) was a display region input. If it is determined that a touch input detected at the previous scan was a display region input, process 1100 can proceed to step 1108. At step 1108, process 1100 can indicate that a swipe toward edge has occurred (e.g., an object or finger contacting the display region swiped toward and onto an edge of the touch sensor panel). In some examples, if at step 1104 an edge input is not detected, process 1100 can return to step 1102. In some examples, if at step 1106 the previous input was not an input from the display region, process 1100 can return to step 1102.

Figure 12:
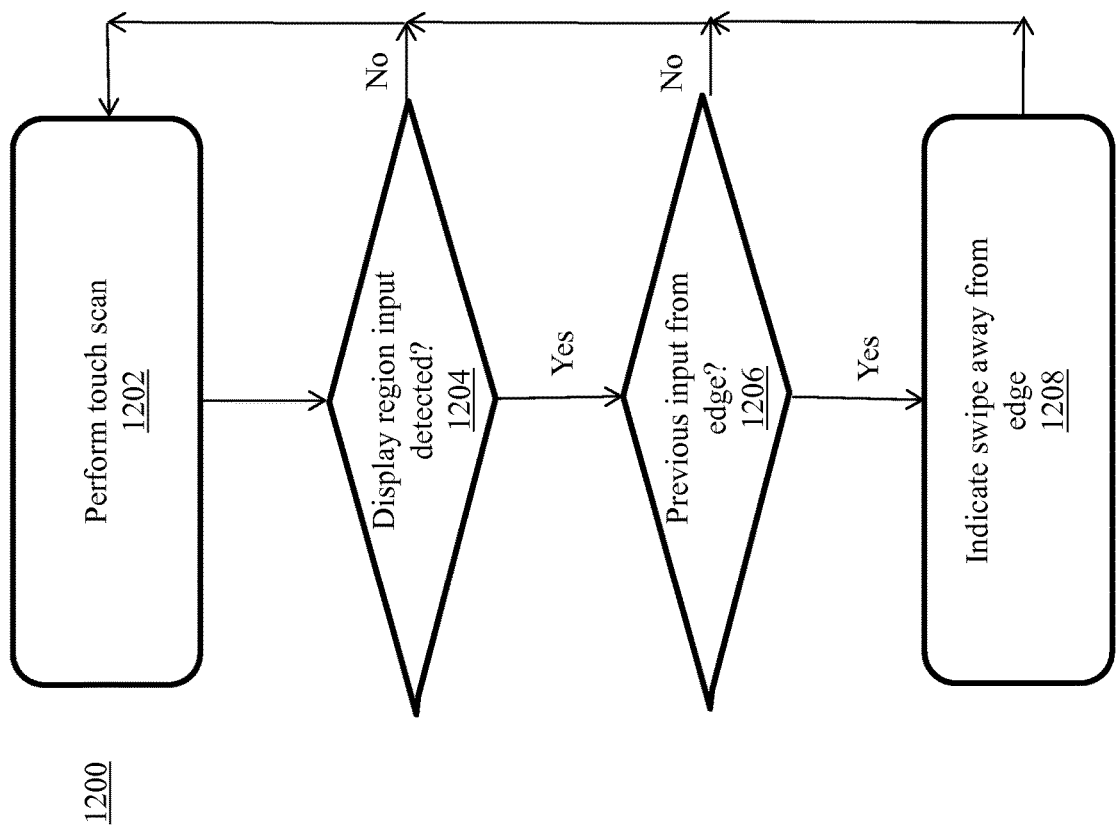
FIG. 12 illustrates another exemplary process for performing edge input detection of a swipe away from edge gesture according to examples of the disclosure.

FIG. 12 illustrates another exemplary process 1200 for performing edge input detection of a swipe away from edge gesture according to examples of the disclosure. At step 1202, process 1200 can perform a touch scan to determine if any touch sensor locations of a touch sensor panel (which can include any or all of touch sensor electrodes 302, touch sensor border electrodes 424, and touch sensor edge electrodes 426 described above) has detected a touch input. At step 1204, process 1200 can determine whether a detected touch input at the touch sensor corresponds to an edge input (i.e. an input on touch sensor edge electrodes 426 and/or touch sensor border electrodes 424), a display region input (which can correspond to a touch input in the display region 306 above), multiple inputs, or no input. In some examples, at 1204, process 1200 can determine information about the touch scan—for instance, whether no touch input occurred in the scan, or if a touch input or inputs did occur, the locations of the touch input or inputs, which can include information about whether the touch input occurred at the display region or at an edge, (e.g., of device 100 above) and a location of the touch input or inputs, including which edge the input occurred on, if appropriate. In some examples, process 1200 can store the result of the determination in a memory or register for multiple consecutive touch scans. In some examples, if it is determined that a detected touch input from the current scan corresponds to a display region input, process 1200 can proceed to step 1206. At step 1206, process 1200 can determine whether a touch input detected at the previous scan (e.g., previously-stored result in memory or a register) was an edge input. If it is determined that a touch input detected at the previous scan was an edge input, process 1200 can proceed to step 1208. At step 1208, process 1200 can indicate that a swipe away from edge has occurred (e.g., an object or finger contacting an edge swiped toward and onto the display region of the touch sensor panel). In some examples, if at step 1204 a display region input is not detected, process 1200 can return to step 1202. In some examples, if at step 1206 the previous input was not an edge input, process 1200 can return to step 1202.

Figure 13:
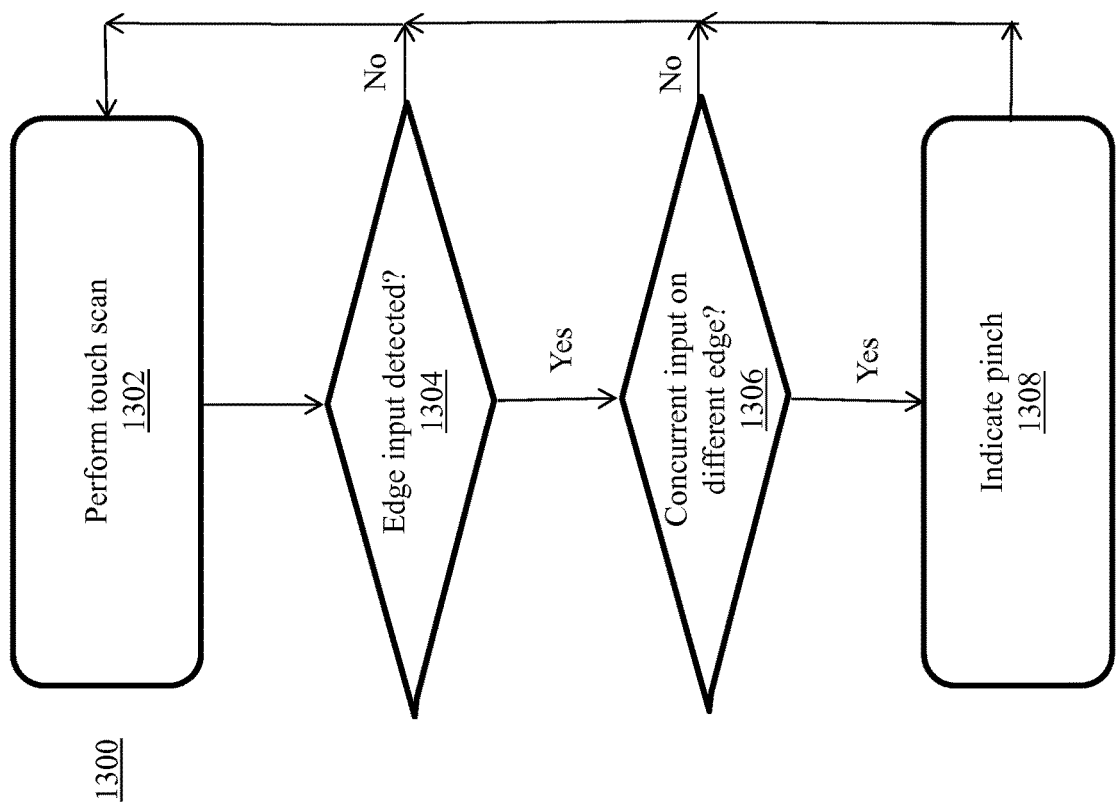
FIG. 13 illustrates another exemplary process for performing edge input detection of a pinch gesture according to examples of the disclosure.

FIG. 13 illustrates another exemplary process 1300 for performing edge input detection of a pinch gesture according to examples of the disclosure. At step 1302, process 1300 can perform a touch scan to determine if any touch sensor locations of a touch sensor panel (which can include any or all of touch sensor electrodes 302, touch sensor border electrodes 424, and touch sensor edge electrodes 426 described above) has detected a touch input. At step 1304, process 1300 can determine whether a detected touch input at the touch sensor corresponds to an edge input (i.e. an input on touch sensor edge electrodes 426 and/or touch sensor border electrodes 424), a display region input (which can correspond to a touch input in the display region 306 above), multiple inputs, or no input. In some examples, at 1304, process 1300 can determine information about the touch scan—for instance, whether no touch input occurred in the scan, or if a touch input or inputs did occur, the locations of the touch input or inputs, which can include information about whether the touch input occurred at the display region or at an edge, (e.g., of device 100 above) and a location of the touch input or inputs, including which edge the input occurred on, if appropriate. In some examples, process 1300 can store the result of the determination in a memory or register for multiple consecutive touch scans. In some examples, process 1300 can proceed to step 1306 if it is determined that a first detected touch input from the current scan corresponds to an edge input at a first edge. At step 1306, process 1300 can determine whether a second detected touch input from the current scan corresponds to an edge input at a different edge. If it is determined that during the current scan a first edge input occurred at a first edge, and a second edge input occurred at a different edge, process 1300 can proceed to step 1308. At step 1308, process 1300 can indicate that a pinch has occurred (i.e., two fingers contacting different edges of the touch panel at the same time). In some examples, if at step 1304 an edge input is not detected, process 1300 can return to step 1302. In some examples, if at step 1306 a second edge input at a different edge has not occurred during the current scan, process 1300 can return to step 1302.

Figure 14:
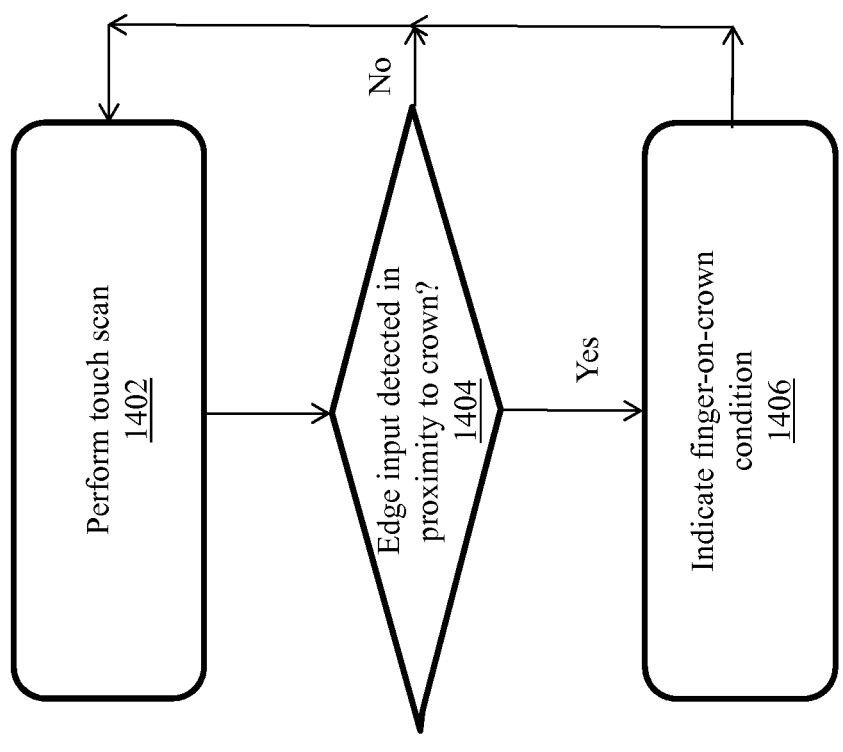
FIG. 14 illustrates an exemplary process for performing finger-on-crown detection according to examples of the disclosure.

FIG. 14 illustrates an exemplary process 1400 for performing finger-on-crown detection according to examples of the disclosure. At step 1402, process 1400 can perform a touch scan to determine if any touch sensor locations of a touch sensor panel (which can include any or all of touch sensor electrodes 302, touch sensor border electrodes 424, and touch sensor edge electrodes 426 described above) has detected a touch input. At step 1404, process 1400 can determine whether a detected touch input at the touch sensor corresponds to an edge input (i.e. an input on touch sensor edge electrodes 426 and/or touch sensor border electrodes 424), a display region input (which can correspond to a touch input in the display region 306 above), multiple inputs, or no input. In some examples, at 1404, process 1400 can determine information about the touch scan, for instance whether no touch input occurred in the scan, or if a touch input or inputs did occur, the locations of the touch input or inputs, which can include information about whether the touch input occurred at the display region or at an edge, and a location of the touch input or inputs, including which edge the input occurred on, if appropriate. In some examples, process 1400 can store the result of the determination in a memory or register for multiple consecutive touch scans. In some examples, if it is determined that a detected touch input from the current scan corresponds to an edge input and that the edge input has occurred in the proximity of a crown (which can correspond to crown 308), process 1400 can proceed to step 1406. For example, at step 1404, process 1400 can determine whether a touch input is detected at a touch sensor edge electrode and/or touch sensor border electrode at a location corresponding to the location of the crown (e.g., a location on the touch screen near the crown of the device). At step 1406, process 1400 can indicate that a finger-on-crown condition has occurred (i.e., a finger is touching or nearly touch the crown). In some examples, if at step 1404 an edge input is not detected, or a detected edge input is not in the proximity of the crown, process 1400 can return to step 1402.

Therefore, according to the above, some examples of the disclosure are directed to an apparatus comprising: a cover substrate having a front surface, a first edge and a first cavity adjacent to the first edge; a plurality of touch sensor electrodes disposed opposite the front surface of the cover substrate; and at least one touch sensor edge electrode disposed within the first cavity on a surface that is angled relative to the front surface of the cover substrate. Additionally or alternatively to one or more of the examples disclosed above, in some examples, the at least one touch sensor edge electrode is disposed on an outward facing curved surface of the first cavity. Additionally or alternatively to one or more of the examples disclosed above, in some examples, the plurality of touch sensor electrodes are formed from a first conductive material and the at least one touch sensor edge electrode is formed from a second conductive material. Additionally or alternatively to one or more of the examples disclosed above, in some examples, the first conductive material is transparent, and the second conductive material is non-transparent. Additionally or alternatively to one or more of the examples disclosed above, in some examples, the second conductive material is formed on a black mask layer disposed around a perimeter of a bottom surface of the cover substrate. Additionally or alternatively to one or more of the examples disclosed above, in some examples, the first and second conductive material are transparent. Additionally or alternatively to one or more of the examples disclosed above, in some examples, an antenna element is at least partially disposed within the first cavity. Additionally or alternatively to one or more of the examples disclosed above, in some examples, the antenna element includes a communication electrode, and the at least one touch sensor edge electrode is formed on the antenna element. Additionally or alternatively to one or more of the examples disclosed above, in some examples, the antenna element includes a plurality of sensor electrodes disposed on a surface of the antenna element, wherein a first group of the plurality of sensor electrodes is configured for transmitting communications signals, and a second group of the plurality of sensor electrodes includes the at least one touch sensor edge electrode disposed within the first cavity. Additionally or alternatively to one or more of the examples disclosed above, in some examples, the antenna element includes a plurality of antenna electrodes, wherein the plurality of antenna electrodes are configured to alternate between transmitting communications signals and detecting touch signals in a time multiplexed manner. Additionally or alternatively to one or more of the examples disclosed above, in some examples, the apparatus further comprises: a second cavity formed in the cover substrate adjacent to a second edge of the cover substrate opposite the first edge; and an antenna element at least partially disposed within the second cavity. Additionally or alternatively to one or more of the examples disclosed above, in some examples, the at least one touch sensor edge electrode is formed on a printed flexible circuit board and the printed flexible circuit board is at least partially disposed within the first cavity. Additionally or alternatively to one or more of the examples disclosed above, in some examples, the at least one touch sensor edge electrode is formed on a black mask layer. Additionally or alternatively to one or more of the examples disclosed above, in some examples, the second conductive material is a non-transparent metal, the at least one touch sensor edge electrode is coupled to an insulator, and the insulator is coupled to the first cavity. Additionally or alternatively to one or more of the examples disclosed above, in some examples, a first touch sensor electrode of the plurality of touch sensor electrodes and the at least one touch sensor edge electrode are routed to a common readout circuit. Additionally or alternatively to one or more of the examples disclosed above, in some examples, the plurality of touch sensor electrodes are configured to detect a proximity of an object near the front surface of the cover substrate, and the at least one touch sensor edge electrode is configured to detect a proximity of an object near the first edge of the cover substrate.

Some examples of the disclosure are directed to an electronic device incorporating the apparatus disclosed in the examples above, the electronic device further comprising a display and a user interface displayed on the display, wherein detecting the proximity of an object near the front surface of the cover substrate produces a first output, and wherein detecting the proximity of an object near the first edge of the cover substrate produces a second output, and the electronic device is configured to detect the first output and the second output and produce a first response on the user interface when the first output is detected, and produce a different response on the user interface when the second output is detected.

Some examples of the disclosure are directed to a method for fabricating a touch panel comprising the steps of: disposing a plurality of touch sensor electrodes on a transparent surface opposite a front surface of a cover substrate, disposing a black mask around border regions of the cover substrate, and disposing at least one touch sensor edge electrode on a surface within a first cavity of the cover substrate such that the at least one touch sensor edge electrode is at an angle relative to the front surface of the cover substrate, wherein the first cavity is adjacent to a first edge of the cover substrate. Additionally or alternatively to one or more of the examples disclosed above, in some examples, the surface within the first cavity of the cover substrate is a surface of an antenna element at least partially disposed within the first cavity. Additionally or alternatively to one or more of the examples disclosed above, in some examples, the surface within the first cavity of the cover substrate is an outward facing surface of the cavity. Additionally or alternatively to one or more of the examples disclosed above, in some examples, the method further comprises the step of: forming first routing traces for routing the plurality of touch sensor electrodes to a readout circuit and forming second routing traces for routing the at least one touch sensor edge electrode to the readout circuit. Additionally or alternatively to one or more of the examples disclosed above, in some examples, the first routing traces are formed from a transparent conductor and the second routing traces are formed from a non-transparent conductor.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An apparatus comprising:
a housing;
a cover substrate coupled to the housing, the cover substrate having a front surface and a first edge;
a plurality of touch sensor electrodes disposed opposite the front surface of the cover substrate;
an input mechanism operatively coupled to the housing and configured to detect a rotational user input;
at least one touch sensor edge electrode proximate to the input mechanism, wherein the at least one edge electrode is disposed within a first cavity and on a surface that is angled relative to a plane through the plurality of touch sensor electrodes; and
a processor configured to determine:
whether a first detected touch input has occurred on the input mechanism based on a first measurement from the at least one touch sensor edge electrode; and
whether a second detected touch input has occurred on the first edge of the front surface based on a second measurement from the at least one touch sensor edge electrode.

2. The apparatus of claim 1, wherein the at least one touch sensor edge electrode is disposed on an outward facing curved surface of the first cavity.

3. The apparatus of claim 1, wherein the plurality of touch sensor electrodes are formed from a first conductive material and the at least one touch sensor edge electrode is formed from a second conductive material.

4. The apparatus of claim 3, wherein the first conductive material is transparent, and the second conductive material is non-transparent.

5. The apparatus of claim 4, wherein the second conductive material is formed on a black mask layer disposed around a perimeter of a bottom surface of the cover substrate.

6. The apparatus of claim 3, wherein the first and second conductive material are transparent.

7. The apparatus of claim 3, wherein the second conductive material is a non-transparent metal, the at least one touch sensor edge electrode is coupled to an insulator, and the insulator is coupled to the first cavity.

8. The apparatus of claim 1, wherein an antenna element is at least partially disposed within the first cavity.

9. The apparatus of claim 8, wherein the antenna element includes a communication electrode disposed on a surface of the antenna element, and the at least one touch sensor edge electrode is formed on the antenna element.

10. The apparatus of claim 8, wherein the antenna element includes a plurality of sensor electrodes disposed on a surface of the antenna element, wherein a first group of the plurality of sensor electrodes is configured for transmitting communications signals, and a second group of the plurality of sensor electrodes includes the at least one touch sensor edge electrode disposed within the first cavity.

11. The apparatus of claim 8, wherein the antenna element includes a plurality of antenna electrodes, wherein the plurality of antenna electrodes are configured to alternate between transmitting communications signals and detecting touch signals in a time multiplexed manner.

12. The apparatus of claim 8, wherein the first cavity is formed adjacent to the first edge, the apparatus further comprising:
a second antenna element at least partially disposed within a second cavity, wherein the second cavity is formed adjacent to a second edge of the cover substrate opposite the first edge.

13. The apparatus of claim 1, wherein the at least one touch sensor edge electrode is formed on a printed flexible circuit board and the printed flexible circuit board is at least partially disposed within the first cavity.

14. The apparatus of claim 1, wherein the at least one touch sensor edge electrode is formed on a black mask layer.

15. The apparatus of claim 1, wherein a first touch sensor electrode of the plurality of touch sensor electrodes and the at least one touch sensor edge electrode are routed to a common readout circuit.

16. The apparatus of claim 1, wherein the plurality of touch sensor electrodes are configured to detect a proximity of an object near the front surface of the cover substrate, and the at least one touch sensor edge electrode is configured to detect a proximity of an object near the first edge of the cover substrate.

17. The apparatus of claim 16, further comprising a display,
wherein detecting the proximity of an object near the front surface of the cover substrate produces a first output, and wherein detecting the proximity of an object near the first edge of the cover substrate produces a second output, and
wherein the electronic device is configured to detect the first output and the second output and produce a first response on a user interface displayed on the display when the first output is detected, and produce a different response on the user interface when the second output is detected.

18. The apparatus of claim 1, wherein the apparatus is a wearable device and the input mechanism comprises a crown.

19. The apparatus of claim 1, further comprising:
a display;
wherein the plurality of touch sensor electrodes is disposed in a display region corresponding to the display and wherein the at least one touch sensor edge electrode is disposed in a perimeter area around the display region.

20. An apparatus comprising:
a housing;
a cover substrate coupled to the housing having a front surface and a first edge;
a plurality of touch sensor electrodes disposed opposite the front surface of the cover substrate, wherein the plurality of touch sensor electrodes is disposed in a display region corresponding to a display;
an input mechanism operatively coupled to the housing and configured to detect a rotational user input;
at least one touch sensor edge electrode proximate to the input mechanism, wherein the at least one touch sensor edge electrode is disposed within a first cavity and on a surface that is angled relative to a plane through the plurality of touch sensor electrodes, and wherein the at least one touch sensor edge electrode is disposed in a perimeter area around the display region; and a processor configured to determine:

whether a first detected touch input has occurred on the rotatable input mechanism based on a first measurement from the at least one touch sensor edge electrode; and whether a second detected touch input has occurred on the first edge of the front surface based on a second measurement from the at least one touch sensor edge electrode.

21. A wearable device comprising:

a housing;

a cover substrate coupled to the housing, wherein the cover substrate includes a first surface and a second surface opposite the first surface;

a touchscreen comprising a display and a plurality of touch sensor electrodes, wherein the plurality of touch sensor electrodes is disposed on the second surface of the cover substrate in a display region corresponding to the display and configured to detect an object touching or in proximity to the first surface of the cover substrate in the display region;

a input mechanism operatively coupled to the housing and configured to detect a rotational user input;

an edge electrode disposed in a perimeter area around the display region and configured to detect an object touching or in proximity to a first edge of the cover substrate in the perimeter area or to detect an object touching or in proximity to the input mechanism; and a processor coupled to the edge electrode, the processor configured to:

determine whether a first detected touch input has occurred on the input mechanism based on a first measurement from the edge electrodes; and determine whether a second detected touch input has occurred on the first edge of the cover substrate based on a second measurement from the edge electrode.

22. The wearable device of claim 21, wherein the edge electrode is disposed in a cavity formed along the second surface of the cover substrate.

23. The wearable device of claim 22, further comprising:

an antenna element disposed at least partially within the cavity; and a communication electrode disposed on a surface of the antenna element;

wherein the edge electrode is disposed on the antenna element.

24. The wearable device of claim 22, wherein the cavity formed along the second surface of the cover substrate is formed in the perimeter area around the display region.

25. The wearable device of claim 22, further comprising:

an antenna element disposed at least partially within the cavity;

a communication electrode disposed on a surface of the antenna element; and a contact pad disposed on a surface of the antenna element, wherein the edge electrode is coupled to the contact pad by a jumper wire or direct conductor-to-conductor contact.

26. The wearable device of claim of claim 21, wherein the edge electrode is smaller than each of the plurality of touch sensor electrodes.

27. The wearable device of claim 21, wherein the edge electrode is oriented at an angle relative to a plane through the plurality of touch sensor electrodes.

* * * * *